United States Patent [19]
Fulton

[11] 3,973,662
[45] Aug. 10, 1976

[54] ACCELERATION CONTROL SYSTEM FOR HIGH SPEED PRINTER

[75] Inventor: John R. Fulton, Brookfield, Ill.

[73] Assignee: Extel Corporation, Northbrook, Ill.

[22] Filed: Aug. 28, 1975

[21] Appl. No.: 608,586

Related U.S. Application Data

[63] Continuation of Ser. No. 528,447, Nov. 29, 1974, abandoned.

[52] U.S. Cl. .................................. 197/1 R; 178/30
[51] Int. Cl.² .......................................... B41J 3/04
[58] Field of Search ............... 197/1 R, 19, 20; 178/23, 24, 25, 26, 30; 340/172.5; 101/93.04, 93.05, 93.15, 93.18

[56] References Cited
UNITED STATES PATENTS

| | | | |
|---|---|---|---|
| 3,286,029 | 11/1966 | Simshauser et al. | 178/30 |
| 3,363,238 | 1/1968 | Clark et al. | 178/23 R |
| 3,444,319 | 5/1969 | Artzt et al. | 178/30 |
| 3,703,949 | 11/1972 | Howard et al. | 197/1 R |
| 3,719,781 | 3/1973 | Fulton et al. | 178/30 |
| 3,814,011 | 6/1974 | Kashio | 197/1 R X |

Primary Examiner—Ralph T. Rader
Attorney, Agent, or Firm—Kinzer, Plyer, Dorn & McEachran

[57] ABSTRACT

An all-electronic print rate control system for a high-speed column sequential dot matrix printer, using a permutation code input signal, an input storage register with a capacity of at least three code words, for storing the input data and a print timing oscillator. The control system comprises a print clock, including a plurality of countdown circuits connected to the oscillator, for generating a normal print rate timing signal and a fast print rate timing signal; the print clock can also generate a variable print rate timing signal in which the initial column intervals are longer than in the normal print rate timing signal and the concluding column intervals are preferably shorter than in the normal signal. A print clock control selects one of these print rate timing signals to control the printing speed in each print cycle, depending on printer conditions in the prior cycle; the variable signal is used whenever the printer has actually come to rest for any appreciable interval.

24 Claims, 6 Drawing Figures

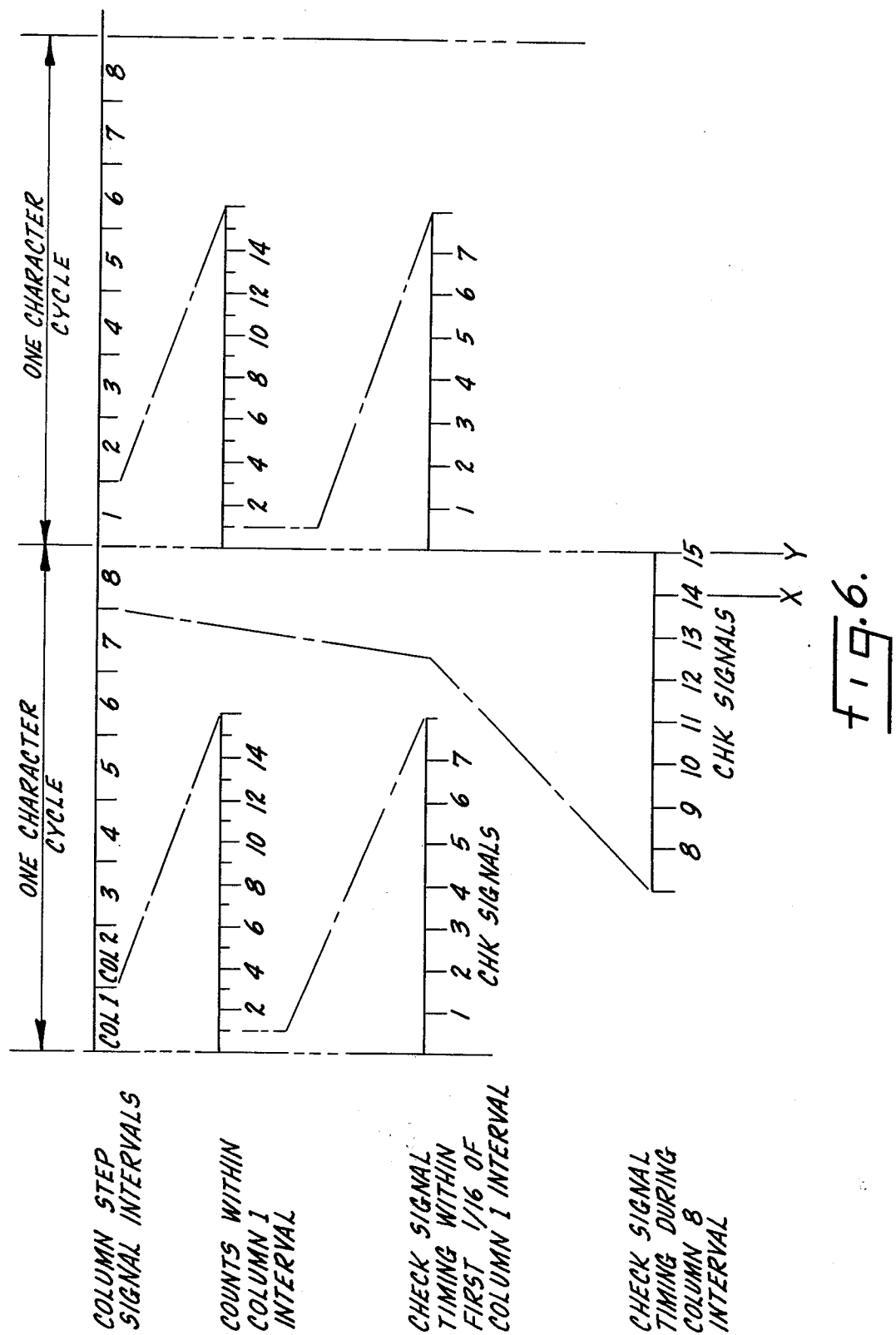

ACCELERATION CONTROL SYSTEM FOR HIGH SPEED PRINTER

This is a continuation, of application Ser. No. 528,447, filed Nov. 29, 1974 now abandoned.

CROSS REFERENCE TO RELATED APPLICATIONS AND PATENTS

The invention covered by this application is an improvement upon the print rate control systems described and claimed in U.S. Pat. No. 3,719,781 of John R. Fulton and Walter J. Zenner issued Mar. 3, 1973 and in application Ser. No. 349,438 of John R. Fulton, filed Apr. 9, 1973. The invention is particularly applicable to a printer mechanism of the kind described and claimed in U.S. Pat. No. 3,670,861 of Walter J. Zenner and Raymond Kranz, issued June 20, 1972.

BACKGROUND OF THE INVENTION

The basic timing requirements for operation of a high-speed printer controlled by a permutation code input signal, such as the standard seven and one-half unit Baudot code or the American Standard Code for Information Interchange (ASCII), are established by the received signal. In a column-sequential dot matrix printer, in which each character is reproduced in a series of sequentially printed columns of dots, with the print head advancing one step for each column, timing of the printer operations can be extremely critical. Each code word, as received, must be translated into a form usable in control of the printer, and the translated information must be presented to the printer with precise timing and at a speed sufficient to permit miltiple functions of the printer mechanism, particularly the sequential step movements of the print head, in each cycle of operation. Conventional print timing controls have not been notably efficient, as applied to column-sequential dot matrix printers, leading to continuing difficulties in maintaining accurate and complete reproduction of all characters.

These timing difficulties are accentuated in connection with non-print functions of the printer; otherwise, errors of substantial magnitude can result. Thus, overprinting, distorted characters, erroneous characters and other errors may result from discrepancies in timing or in code recognition.

In a printer operated at moderate speeds, of the order of five to ten characters per second, carriage return and line feed operations can be accommodated by storing one or more code words during the time intervals required for these operations. To avoid loss of characters or other data, the printing rate is increased somewhat. This results in some "dead" time in each character-printing cycle, whenever the storage register has been cleared, which presents no particular operational problems at low speeds.

If the printer speed is materially increased, however, a number of problems are encountered. At higher speeds, one or more characters may be lost during a carriage return operation if the printer does not print rapidly enough to empty the storage register in time to accept further input data. This problem can be partly alleviated by increasing the input storage capacity, but it becomes necessary to print each character faster than received. As a consequence, whenever the input register is cleared the printer operates with a carriage motion that prints one character, waits for the next character, prints the next character, and so on. The resulting "dead" time in each character printing cycle produces a start-stop motion which is intolerable at high printing speeds because the natural resonance of the carriage and associated components is approached, causing severe vibration and bouncing of the carriage. The overall result is often an unacceptable reduction in quality of the printed copy. Other mechanical problems are encountered, particularly in accelerating the printer to full speed, as at the end of a carriage return or following an appreciable interruption in incoming data.

For moderate print rates, a two-speed print rate control can be effective; a normal speed matched to the rate of incoming data is used whenever there is only one code word in the input register and a higher speed is employed when two or more code words are available in the register. Two quite different systems of this general kind are disclosed in the aforementioned Fulton application, Ser. No. 349,438, and in Kritz et al U.S. Pat. No. 3,761,880.

For higher speed operations, particularly at printing rates of the order of twenty-five, thirty, or more characters per second, some substantial difficulties are presented even with a well-designed dual-rate print control. Thus, substantial character distortion may yet be experienced, due to the extremely rapid accelerations required and the unavoidable inertia and elasticity of the printer carriage drive mechanism. This is particularly true whenever the printing mechanism starts from rest, whether at the end of a carriage return operation, or following an interruption in transmission, or upon the occurrence of one or more nonprint functions in operation of the printer.

SUMMARY OF THE INVENTION

It is a principal object of the invention, therefore, to provide a new and improved print rate control system for a high speed column-sequential dot matrix printer actuated by a conventional permutation code input signal, which effectively provides for three different printing speeds, including a normal speed approximately matched to the pulse rate of the incoming data, and a fast speed to clear accumulated data, and a variable speed that affords a smooth acceleration of the printer whenever it has been at rest for any appreciable interval.

An additional object of the invention is to provide a multi-speed print rate timing system for a column-sequential dot matrix printer that adjusts the printing rate to accommodate a variety of different operating conditions, with a smooth transition between different operating speeds, particularly following any non-print function.

A specific object of the invention is to provide an improved print clock and print clock control, for a high speed column-sequential dot matrix printer, that effectively reduces the cycle time for all non-print functions other than carriage return and line feed, to allow smoother high speed operation.

A further object of the invention is to afford an improved print clock and print clock control for a high speed column-sequential dot matrix printer that allows a change in normal print rate by a simple change in one oscillator, without changing the clock or control logic.

Accordingly, the invention relates to an electronic print rate control system for a high speed column-sequential dot matrix printer utilizing a permutation code data input signal comprising a sequence of code words which, in continuous operation, occur at a given maximum receiving rate. The invention is used in a printer comprising a print head and a print head drive for moving the print head through a sequence of a given number of column steps, in each print cycle, at a speed controlled by a print rate timing signal which also controls other printer functions; an operational storage register including an input stage, at least one intermediate stage, and an output stage; input means for recording each received code word in the input stage of the storage register; and shift means for shifting each code word through the register to the output stage. The print rate control system comprises print clock means for generating: (1) a normal print rate timing signal of given normal frequency to actuate the printer to reproduce spacing characters at a normal print rate approximately equal to the maximum receiving rate, (2) a fast print rate timing signal, having a frequency higher than the normal frequency, to actuate the printer to reproduce spacing characters at a fast print rate, substantially faster than the normal print rate, and (3) a variable print rate timing signal progressively increasing in frequency from an initial frequency substantially lower than the normal frequency to a final frequency at least as high as the normal frequency, during a limited number of print cycles. The system further comprises print clock control means, connected to the timing signal generating means and to the printer, for applying one of the print rate timing signals to the printer during each print cycle, each in accordance with different predetermined operating conditions of the printer at the beginning of the print cycle; print clock control means applies the variable print rate timing signal to the printer for any print cycle in which a spacing character is reproduced following an interval in which the print head has been at rest.

BRIEF DESCRIPTION OF THE DRAWINGS

FIG. 6 is a timing diagram employed in explanation of the operation of the control system of FIGS. 4 and 5.

DESCRIPTION OF THE PREFERRED EMBODIMENT

THE BASIC PRINTER

Figure 1:
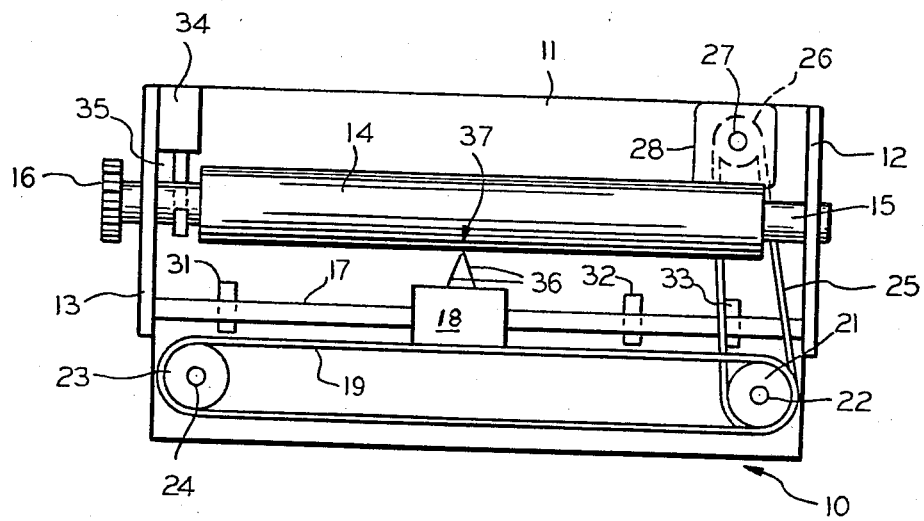
FIG. 1 is a simplified plan view of a high speed dot matrix printer of the general kind to which the control systems of the present invention may be applied.
Figure 2:
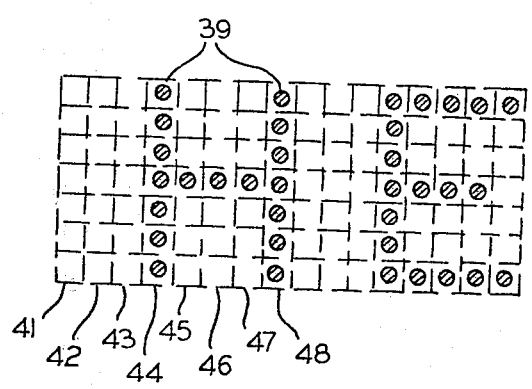
FIG. 2 illustrates the form of the characters printed by the printer in FIG. 1.

FIG. 1 illustrates, in simplified form, a high speed printing machine 10 in which the control system of the present invention may be employed; the printer 10 produces characters in dot matrix form as shown in FIG. 2. Printer 10 comprises a base 11 with two vertical frame members 12 and 13 affixed to the opposite sides of the base. A platen 14 is mounted upon a rotatable shaft 15 that extends between the two side frame members 12 and 13. A knob 16 is mounted on one end of shaft 15 to provide for manual rotation of the platen.

A carriage guide rail 17 is mounted at the front end of printer 10, extending transversely of the printer parallel to platen 14. A carriage 18 is mounted upon guide rail 17 and is connected to a carriage positioning belt 19. Preferably, belt 19 is a toothed belt of the kind known as a timing belt. Belt 19, at its right-hand end, extends around a drive sprocket 21 mounted upon a shaft 22 that projects upwardly from base 11. The other end of belt 19 engages an idler sprocket 23 mounted upon a vertical shaft 24 at the left-hand side of the printer base.

Shaft 22 is connected to a pulley, not shown, that is engaged by a drive belt 25. The drive belt 25 extends around a drive sprocket 26 mounted upon the shaft 27 of a stepping motor 28. Motor 28 is a reversible motor that rotates through a discrete angle of rotation each time an electrical signal pulse is applied to the windings of the motor.

There are three control switches 31, 32 and 33 mounted on base 11 in position to be actuated by engagement with carriage 18. Switch 31 is located at the left-hand side of printer 10 and constitutes a left-hand margin control switch. Switch 33 is located at the right-hand side of the printer and comprises a right-hand margin control switch. Switch 32 is located intermediate switches 31 and 33, but substantially nearer to switch 33, and may be utilized for control of the right-hand margin, during printing operations, for material that has not been grouped in specific line groupings.

Printer 10 also includes a line feed actuator 34 mounted in the rear left-hand corner of the printer on base 11. Actuator 34, which may comprise a solenoid or a stepping motor, is connected to a line feed linkage 35 for rotating platen 14 through a discrete angular distance to achieve a line feed operation. In operation, a sheet or web of paper extends around platen 14 and is imprinted by impact from a plurality of printing rods or needles 36 that extend from carriage 18 toward platen 14. In a typical printer, there are seven rods 36 arranged in vertical alignment with each other at the printing station 37 adjacent the surface of platen 14, each provided with an individual drive magnet (not shown).

Printer 10 is, essentially, a simplified illustration of the high speed printer described and claimed in U.S. Pat. No. 3,670,861 of Walter J. Zenner and Raymond E. Kranz, issued June 20, 1972, to which reference may be made for a more complete and comprehensive description of the mechanical construction and operation of the printer. Details of some of the mechanical linkages in the printer, such as a return spring for return of carriage 18 to the left-hand margin and a clutch to release the carriage drive for return movement, have been omitted as unnecessary for an understanding of the present invention. The preferred construction for carriage 18, including print rods 36 and the print rod magnets, is described and illustrated in detail in U.S. Pat. No. 3,729,079 of Messrs. Zenner and Kranz, issued Apr. 24, 1973. Only a brief description of the mechanical operation of printer 10 is necessary in this specification.

In the operation of printer 10, as noted above, a sheet or web of impact-sensitive paper is extended around platen 14, between the platen and the print rods 36 of the printer. If preferred, ordinary paper and a carbon ribbon or carbon sheet can be employed. The starting position for carriage 18 is at the left-hand end of its travel on guide 17, adjacent the left-hand margin switch 31. For the first character to be imprinted, such as the character H illustrated in FIG. 2, carriage 18 advances P discrete steps from left to right, the carriage being driven by its positioning belt 19 through the drive afforded by stepping motor 28, drive belt 25, and sprocket 21; in the illustrated embodiment, $p = 8$. During the first three steps or column movements of carriage 18, no impression is made on the paper. In the next five steps of the carriage, the complete character is imprinted by selective actuation of rods 36.

As shown in FIG. 2, the initial advancing movement of carriage 18 leaves three blank columns 41, 42 and 43 preceding the first character to be imprinted. In the first character column 44, all seven of the print rods 36 are driven into impact with the paper, producing seven vertical dot impressions 39. On the next incremental step in the advancing movement of carriage 18, only one dot impression 39 is formed, at the fourth or center level. This action is repeated in the next two columns 46 and 47 in the advancing movement of carriage 18. In the eighth step of carriage 18, all seven of the print rods 36 are again actuated, producing seven dot impressions in the final column 48. This results in formation of the letter H as illustrated in FIG. 2. In this same manner, a complete line of characters is imprinted across the paper on platen 14, with carriage 18 moving from left to right a total of eight steps for each individual character.

As carriage 18 approaches the right-hand end of platen 14, it first engages switch 32. Switch 32 may be utilized to actuate a return mechanism (not shown) to return carriage 18 to the left-hand side of printer 10 and initiate printing of a new line. Under other operational circumstances, discussed more fully hereinafter, carriage 18 may continue its movement unitl it engages switch 33, at which time the carriage return and line feed mechanisms of printer 10 are mandatorily actuated to return the carriage to the initial line position and to feed the paper. Before a new line of print is initiated, actuator 34 rotates platen 14 through one or more feed increments, aligning a fresh line segment of the paper web with carriage 18.

In the preferred form of printer, the carriage return operation is effected by reverse rotation of motor 28 through a discrete number of steps, which reverse movement operates a spring-return mechanism that performs the necessary carriage return operation. In the carriage drive for the printer described in the aforementioned Zenner and Kranz U.S. Pat. No. 3,670,861, the carriage return action is initiated by reverse rotation of motor 28 through four steps, but a different number of reverse rotational steps for initiation of a carriage return could be employed if desired.

ordinarily, each carriage return operation is initiated by a carriage return function code incorporated in a telegraph signal that controls printer 10. On the other hand, if the telegraph signal does not include suitable carriage return codes, the control system described in the aforementioned Fulton and Zenner U.S. Pat. No. 3,719,781 can be utilized to effectuate a carriage return operation upon the occurrence of any space code after carriage 18 has actuated switch 32, thus affording an automatic carriage return and line feed operation. A separate line feed code is utilized to actuate the line feed mechanism comprising solenoid 34 and linkage 35. Other non-print function codes may be included in the received signal and can be utilized in control of printer 10.

Figure 3:
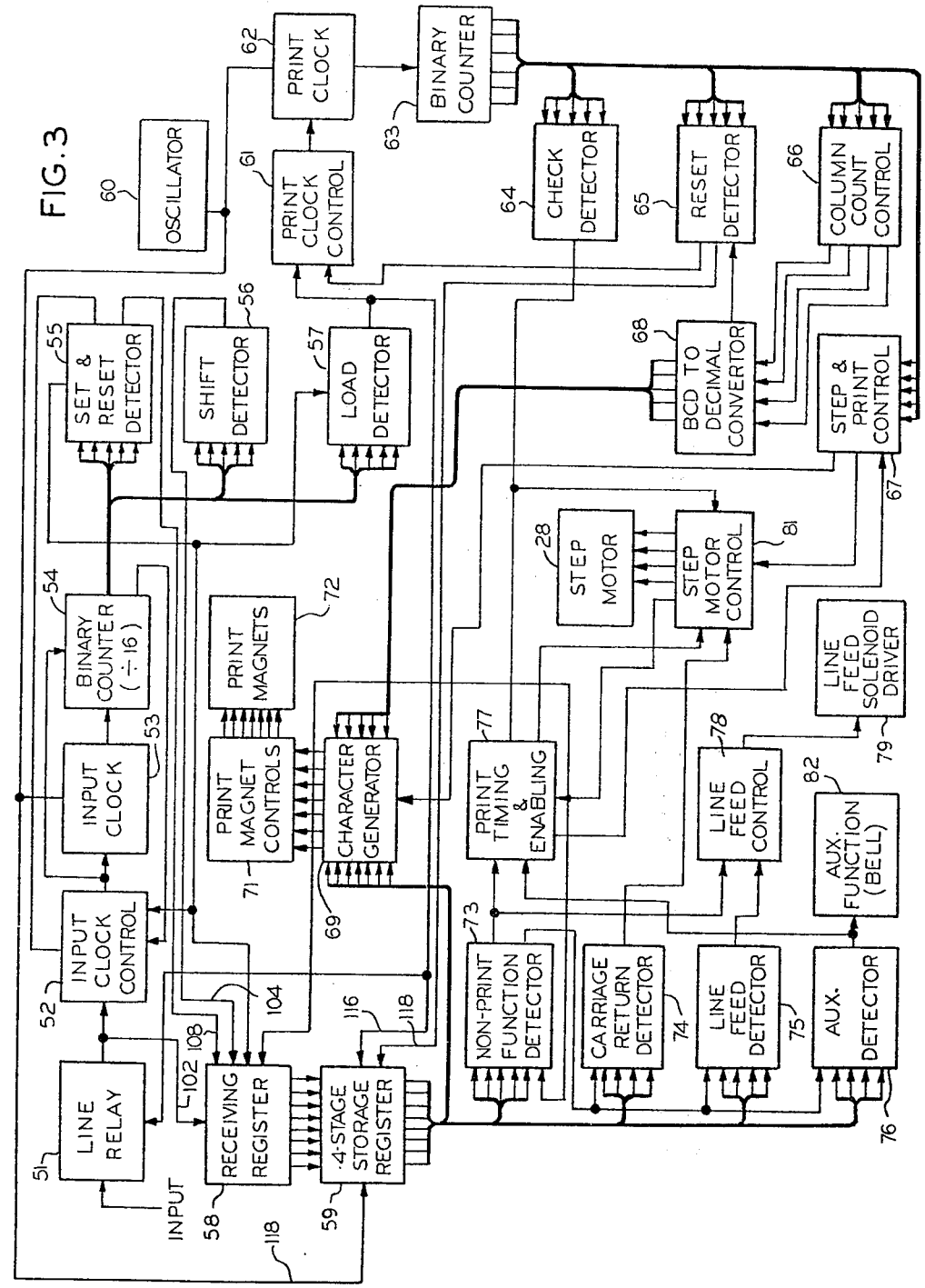
FIG. 3 is a block diagram of a high speed printer control system in which the improvements of the present invention may be incorporated.

FIG. 3 illustrates, in block diagram form, a printer control system 50 taken from the Zenner-Fulton patent, but with some modification to suit the present invention. The input stage of system 50 is a line relay circuit 51 to which a conventionally coded telegraph signal is supplied. In the following description, it is assumed that the incoming signal is encoded in accordance with the standard eleven-unit ASCII code or the conventional seven and one-half unit Baudot code, but other permutation codes can be employed with appropriate modifications in the control system to interpret the code.

The output of line relay 51 is connected to an input clock control circuit 52. Clock control circuit 52 is in turn coupled to an input clock 53. Clock 53 may comprise a start-stop multivibrator or other oscillator of constant frequency, or may comprise a countdown circuit energized from a separate oscillator 60. The input clock frequency is taken as an integral multiple of the pulse rate of the input signal; for the control described herein, a multiple of 16 is used. For the ASCII permutation code, which is an eleven-unit code comprising one start pulse, eight data pulses, and two stop pulses, the output frequency for clock 53 is 5280 Hz, assuming an input rate of 30 characters per second and a pulse rate of 330 pulses per second. For the conventional Baudot code, clock 53 may have a frequency of 3600 Hz for thirty cps operation.

The output of clock 53 is applied to a binary counter 54. Counter 54 is a 16 stage counter and thus cycles once for each pulse in the input signal. The final stage of binary counter 54 is connected back to the input clock control circuit 52. The outputs from the binary counter are connected to a set and reset detector circuit 55, to a shift detector circuit 56, and to a load detector circuit 57. Though shown as separate circuits, detectors 55–57 may comprise a single BCD-to-decimal decoder capable of developing appropriate set, reset, shift and load signals.

The output of circuit 51 is also connected to a receiving data storage register 58 serving as an initial buffer storage unit for the control system. Receiving register 58, comprising an all-electronic serial-in parallel-out shift register, also receives control signals from the set and reset detector 55 and from the shift detector 56. Another output from the set and reset detector 55 is connected back to the input of clock control circuit 52.

The individual storage circuits in receiving register 58 are connected in parallel to individual storage circuits in the first stage of an operational storage register 59. Register 59 has a shift input connection from the output of oscillator 60. A control input to storage register 59 is supplied from load detector 57. The output of load detector 57 is also connected in a control circuit to line relay 51 and to a print clock control circuit 61.

The output of the print clock control circuit 61 is connected to a print rate timing signal generator 62 which is in turn connected to a binary counter 63; signal generator 62 is usually referred to as a print clock. The clock control, clock, and counter circuits 61–63 constitute a print clock means essentially similar to circuits 52–54; indeed, clock 62 is preferably actuated from the same oscillator 60 that supplies input clock 53. However, print clock 62 operates at a different frequency from input clock 53. The operating frequency for print clock 62 is determined by the printing pulse rate for printer 10 and is made equal to an integral multiple of the printing pulse rate. The printing rate is equal to or faster than the incoming signal pulse rate but the print clock frequency may actually be either lower or higher because the printer requires only eight pulses per character, as described above, in connection with FIG. 2, instead of the eleven or 7.5 pulses per character in the input signal. Thus, the normal frequency for print clock 62, for 30 cps operation, would be 3840 Hz. However, print clock 62 may also operate at substantially different frequencies when system 50 is modified in accordance with the present invention, as described below in connection with FIGS. 4–6.

The outputs from the various levels of binary counter 63 are connected to a check signal detector 64, a reset detector 65, a column count control circuit 66, and a step and print control circuit 67. Detector 64 produces a check signal that is applied to receiving register 58 and to a number of other circuits in control system 50. The output of reset detector 65 is connected to the print clock control circuit 61 to reset that circuit at the end of each code word. The column count control circuit 66 has a plurality of output circuits individually connected to the several stages of a BCD-decimal decoder 68. Decoder 68 has a plurality of output circuits individually connected to a character generator 69, and one output connected to reset detector 65.

Character generator 69 has an input circuit connected to an output of the step and print control circuit 67. In addition, character generator 69 has a plurality of input circuits that are connected to the individual stages of the operational storage register 59. Character generator 69, which is a commercially available signal translation matrix of integrated circuit construction, affords seven output circuits, one for each of the printing rods 36 of printer 10 (FIG. 1). Each output of character generator 69 is individually connected to one of seven print magnet control circuits 71. Each print magnet control is in turn connected to an individual magnet or solenoid 72 for actuating one of the print rods 36.

The input signal to system 50 includes a number of codes for printer functions other than the imprinting of individual characters. The occurrence of any of these non-print function codes is identified in a detector 73 having a plurality of inputs connected to the outputs of individual storage circuits in the last or output stage of storage register 59. In addition, separate detector circuits are provided for specific non-print function codes necessary to operation of the printer. These include a carriage return detector 74, a line feed detector 75, and an auxiliary function detector 76. Each of the individual function code detectors 74, 75 and 76 is provided with an input from the non-print function detector 73 as well as a plurality of inputs from the final stage of storage register 59.

One output from the non-print function detector 73 is connected to a print timing and enabling circuit 77 and to a line feed control circuit 78. Circuit 78 has a second input derived from line feed detector 75. The output of the line feed control circuit 78 is connected to a line feed driver circuit 79 for energizing the line feed actuator 34 of the printer (FIG. 1).

The output of the auxiliary function detector 76, FIG. 3, is connected to an auxiliary function circuit 82, which may comprise a buzzer, a bell, or other auxiliary device. The output of detector 76 is also connected to a second input for the print timing and enabling circuit 77. The print timing and enabling circuit 77 has one output that is connected to the step and print control 67. Another output from the enabling circuit 77 is connected to a step motor control circuit 81. Circuit 81 has a second input derived from the output of carriage return detector 74 and a third input taken from the output of check detector circuit 64. The check signal developed in detector 64 is also supplied to the print timing and enabling circuit 77 and to the non-print function detector 73.

The step motor control circuit 81 has four outputs individually connected to four motor windings in step motor 28. Control 81 determines the direction of rotation of step motor 28 and controls the number of steps through which the motor is driven in any given operational sequence.

In considering operation of control system 50, it should be remembered that the initial pulse in each code word, in the ASCII telegraph signal supplied to line relay 51, is a start pulse of given polarity, sometimes referred to as a "space" pulse. The next eight pulses in each code word are data pulses identifying a particular character or a specific printer function; these eight data pulses may be "space" pulses or may be "mark" pulses, which are opposite in polarity to the "space" pulses. The final two pulses in the code word are stop pulses; both are "mark" pulses. In the following description it is assumed that the "space" pulses in the incoming signal are negative-going signals and that the "mark" pulses are positive-going signals.

PRINTER OPERATION IN RESPONSE TO CHARACTER CODE

When a signal transmission to control system 50 is initiated, the first code pulse or baud in the input signal is a "space" signal pulse which actuates line relay 51, producing an output signal that triggers the input clock control circuit 52 to start input clock 53 in operation. As noted above, clock 53 produces a clock signal at a frequency of 16 times the pulse rate of the input signal; this clock signal is supplied to binary counter 54. From the frequency relations given above, it can be seen that binary counter 54 produces 16 output signal pulses during the time interval prior to occurrence of the next pulse in the incoming signal, which may be either a "space" or a "mark" pulse, depending upon the character or function code being transmitted.

when counter 54 reaches a count of six, the set and reset detector 55 is actuated, producing a set signal that is supplied back to the input clock control 52 to maintain input clock 53 in operation for the full period of time required for receipt of a given character or other code word. That is, the set signal from circuit 55 maintains the input clock means 52–54 in operation until reset upon receipt of all of the data pulses in a complete code word.

When counter 54 reaches a count of seven, shift detector 56 produces a shift pulse that is supplied to receiving register 58. The shift pulse records the space signal appearing at the output of line relay 51 in the initial storage circuit of receiving register 58. when counter 54 reaches a count of sixteen, indicating completion of one pulse of the input signal, the final stage of counter 54 produces an output signal that is supplied to the input clock control 52; at this time, however, this does not alter the operating condition of the input clock control and the input clock 53 continues to run.

During the second cycle of operation of the input clock means 52–54, the second input signal pulse is received in line relay 51. This is the first data pulse; it may be a mark signal or it may be a space signal. At count seven of counter 54, during this first data signal pulse, a shift signal is again supplied to receiving register 58. This shifts the initially recorded space pulse to the second storage circuit in the receiving register and records the present output of line relay 51 in the first storage circuit of receiving register 58. This process continues, with the shift detector 56 producing a shift pulse in each cycle and recording the incoming data from line relay 51 sequentially in the individual storage devices comprising receiving register 58.

When the initial space pulse that started the transmission reaches the final storage circuit of receiving register 58, the receiving register produces an end-of-character signal that is supplied to the set and reset detector 55, to the load detector 57, and to the input clock control 52. This is an enabling signal that conditions the system for subsequent operations.

In the next cycle of the input clock means 52–54, on the count of three in counter 54, a load signal is developed by load detector 57. This load signal is supplied to storage register 59 and is utilized to transfer the information that has been recorded in receiving register 58 into the first stage of the operational storage register 59. The transfer of data between registers 58 and 59 is accomplished in a single input clock pulse, the transfer being effected on a parallel basis between individual storage circuits in the two registers. In normal operation, the code word recorded in the initial stage of register 59 is rapidly transferred to the final stage of the register; during a carriage return, the internal transfer within register 59 may be delayed, as explained hereinafter. The load signal is also applied to line relay 51 to reset the line relay to the mark condition to prevent running of the printer on an "open line" condition.

On the count of five in counter 54, after a complete set of data pulses for a code word has been stored in receiving register 58, and transferred to the initial stage of storage register 59, detector 55 develops a reset signal. This reset signal is supplied to input clock control 52 to interrupt operation of input clock 53 until a further code signal is received from line relay 51. The reset signal is also used to clear receiving register 58, recording mark bits in all storage circuits of the receiving register in preparation for recording a new code word. The resetting of register 58 also serves to reset the end-of-character circuits in receiving register 58, so that the enabling signal previously supplied from register 58 to clock control 52 and to detectors 55 and 57 is terminated.

The output signal from load detector 57, in addition to the functions described above, is also supplied to print clock control circuit 61 to initiate operation of print clock 62. Thus, almost immediately after a complete character or function code has been stored in register 59, the print clock 62 is started, affording a clock signal for timing all of the operational control circuits 59–82. The output pulses from print clock 62 are counted in binary counter 63 which, like counter 54, counts in groups of sixteen. On each count of one in the input of binary counter 63, control 66 is actuated to produce a column count signal that is supplied to converter 68 for conversion from binary coded decimal to decimal notation. For each complete character (or function) code, there are eight pulses in the column count signal.

On each count of three in the output of binary counter 63, a check signal is produced by detector 64. This check signal is supplied to receiving register 58 to assure resetting of that register to an all marking condition. The check signal developed by detector 64 is also supplied to circuits 73, 77, and 81.

Printer 10 uses a total of eight columns for each character, but the first three columns are usually utilized for spacing between characters with only the last five columns actually employed for printing. Consequently, only five output signal connections are shown from decoder 68 to character generator 69; the signals from the decoder are employed in the character generator as column strobe signals. In some applications, embodying special characters (e.g., fractions or weather symbols) all eight column signals may be supplied to device 69. The first column signal output from decoder 68 is supplied to column count control 66 for check pulse gating.

Each storage circuit in the output stage of storage register 59 is coupled to an individual input for character generator 69. This information is continuously available to the character generator until new code data is shifted into the final stage of storage register 59 by another load pulse from detector 57. The character generator develops a series of output signals, in response to the column strobe signals from converter 68, that are utilized to actuate the individual print magnets 72 for the print rods 36 of printer 10.

When counter 63 reaches a count of seven, near the mid-point of the counter cycle, circuit 67 is actuated to develop a "step" signal that is supplied to step motor control 81. This step signal is utilized, in control 81, to develop appropriate drive signals to advance step motor 28 one step. This action occurs once for each of the eight columns entrailed in reproduction of a single character. The step and print control 67 also receives a timing signal from the print timing and enabling circuit 77 and develops a print pulse timing signal that occurs shortly after the step signal. The print pulse timing signal is supplied to character generator 69 to control timing of energization of the print magnets 72, so that the print magnets are always energized immediately after step motor 28 has advanced one step.

As noted above, character generator 69 may be a commercially available integrated circuit matrix suitable for generating actuating signals in response to the code data signals in the final stage of storage register 59, the column count signals from converter 68, and the print signals from control 67. In the reproduction of most characters, only the column count signals for columns four through eight (columns 44–48 in FIG. 2) are supplied to character generator 69. Upon the receipt of one column count signal pulse, character generator 69 (FIG. 3) develops from zero to seven actuating signals, depending upon the particular print magnets that are to be energized for each given column of the character being reproduced. These signals are supplied to the individual print magnets 72, through appropriate drive circuits in the print magnet control 71, reproducing the desired character as described above in connection with FIGS. 1 and 2.

After completion of printing of the character, on the occurrence of a count of 12 in the output of binary counter 63 and with a column eight signal available from converter 68, reset detector 65 is actuated to produce a reset signal that is supplied to print clock control 61. This effectively stops print clock 62, readying control system 50 for printing of another character or for any other function dictated by the next code word received by line relay 51.

PRINTER OPERATION IN RESPONSE TO A FUNCTION CODE

The initial operation of control system 50 in response to a non-print function code word is basically the same as for a character code word. Thus, the initial space pulse at the beginning of the function code word intiiates operation of input clock 53. The code word is stored in receiving register 58, pulse by pulse, in the same manner as described above, under control of the shift signal from detector 56. When all data pulses from the complete code word are stored in receiving register 58, the end-of-character circuits in the receiving register are actuated and initiate the transfer of the complete code data from receiving register 58 to the first stage of storage register 59. In register 59, the code word is rapidly transferred from the first stage to the last or output stage. The load signal from detector 57 that initiates transfer operations between registers 58 and 59 again starts print clock 62 by actuation of control 61. As before, on count five of binary counter 54, a reset signal is generated by detector 55 to condition the input circuits for receipt of a new code word.

With print clock 62 in operation, column count control 66 is again actuated to develop a column count signal comprising eight equally spaced pulses. Moreover, when counter 63 reaches a count of three, check detector 64 again develops a check pulse that is supplied to motor control 81 and to the print timing and enabling circuit 77. The check signal is also applied to the non-print function detector 73, which identifies the code data now stored in register 59 as pertaining to a non-print function rather than to a character to be imprinted. Thus, detector 73 utilizes the check signal from detector 64 and the data signals stored in register 59 to develop a non-print function signal that is supplied to the print timing and enabling circuit 77, to the line feed control 78, and to each of the several different function detectors 74, 75 and 76.

If the data in the final stage of register 59 constitutes the code for a carriage return operation, detector 74 is actuated to develop a carriage return signal that is supplied to step motor control 81. The carriage return signal is utilized by control 81 to initiate a reverse stepping movement of motor 28, where reverse movement of the motor constitutes the mechanical action necessary to begin a carriage return operation in printer 10. In the preferred form of the control system, motor 28 is stepped four steps in the reverse direction to release carriage 18 and allow it to return to the initial line position at the left-hand side of printer 10. In this arrangement, the left-hand margin switch 31 is connected to step motor control 81 to step the motor 28 forward four steps and restore the normal driving conditions for carriage 18 once the carriage has reached its initial position at the left-hand side of the printer.

The selection of the number of reverse steps of motor 28 required to initiate a carriage return movement is subject to substantial variation. Three, five, or even eight steps could be utilized for this purpose if desired. On a practical basis, four steps of reverse movement for motor 28 is adequate and effective in relation to the carriage return operation. It will be recognized, of course, that with a different mechanism for carriage return, the output of carriage return detector 74 could be applied to a separate carriage return device as required.

In the event that the data in storage register 59 represents a line feed code, line feed detector 75 is actuated by the output signal from the non-print function detector 73 and by the data signals from register 59, producing a line feed signal that is supplied to the line feed control 78 together with the non-print function signal from detector 73. Control 78 supplies an actuating signal to the line feed driver circuit 79, energizing actuator 34 and initiating a line feed operation. During the line feed operation, operation of step motor 28 is inhibited.

If the data stored in the final stage of register 59 is a separate auxiliary code for a non-print function, it is detected in auxiliary detector circuit 76. Detector 76 produced an output signal that is supplied to the print timing and enabling circuit 77 to preclude actuation of step motor 28 through control 81. The output signal from auxiliary detector 76 is also supplied to auxiliary function circuit 82 to ring a bell, sound a buzzer or perform such other auxiliary function as may be required.

For each non-print function code, just as for each character code, column count control 66 is operated and supplies the column count signal to converter 68. When the column eight stage of converter 68 is actuated, it produces an output signal that is supplied to reset detector 65. Detector 65 produces a reset signal that is applied to the print clock control 61 to interrupt operation of print clock 62 and thus condition system 50 for the next received code word.

From the foregoing description, it can be seen that each received character or function code is first stored in the buffer register 58 by the distributor circuits comprising the line relay 51, the input clock means 52–54, and detectors 55, 56 and 57. Once all of the data pulses of a complete character or function code word are stored in register 58, the data is transferred from the receiving register to storage register 59. The load signal from detector 57 that initiates the transfer of data between registers 58 and 59 also initiates the next operational phase of system 50, which may be the printing of a character or may comprise some other machine function. During the time that a character is printed or some other machine function is effected, a further character or function code can be received and stored in the buffer store comprising receiving register 58. The overall operating cycle for the printing and function circuits of system 50, controlled by the print clock means 61–63, is somewhat shorter than the data input cycle controlled by the input clock means 52–54. Accordingly, printing of a character or accomplishment of another machine function dictated by data in storage register 59 is accomplished before it is necessary to transfer new data into register 59 from receiving register 58.

THE PRINT RATE CONTROL SYSTEM OF THE INVENTION

To alleviate the difficulties discussed above, the print rate control system of the invention provides for gradual acceleration of the carriage (print head) drive. This is particularly convenient when a step motor is the basic driving element that steps the carriage through each column in the character reproduction cycle. Thus, gradual acceleration may be applied, for movement of the print head 18 through a limited number of character reproduction cycles, at any time when the carriage has been at rest for a period of one column interval or more at the nominal receiving rate.

It may also be desirable to provide for operation of a stepping motor drive at a rate lower than the normal print rate in order to accommodate special requirements of the carriage drive. For example, in the printer of the aforementioned Zenner-Kranz U.S. Pat. No. 3,670,861, the drive linkage between step motor 28 and carriage drive belt 19 (FIG. 1) includes a gear train which is disengaged to carry out a carriage return operation; disengagement is effected by rotating motor 28 in reverse through only a few steps. When carriage return has been completed, re-engagement of the gears is effected by a correspondingly short forward rotational movement of the motor. For re-engagement of this gear train, it may be desirable to step the motor 28 at a substantially lower rate than the normal print rate.

For a normal print rate of the order of 30 characters per second, a substantial number of code words may be in storage in input register 59 (FIG. 3) at any given time. In current commercial printers of Extel Corporation, register 59 has a capacity of 64 code words. This stored data may include codes for a number of non-print functions, including the auxiliary (bell) function, shift functions to change from figures to letters and back again, a null function to change type fonts, and the like. To minimize the periods of time in which the printer operates in its high speed mode, and to increase overall efficiency, it may be desirable to shorten the cycle time for such non-print functions. This can be accomplished by actuating the print clock through only a portion of its normal operating cycle, just long enough to carry out the non-print function, and then shifting the recorded data through storage register 59, thus resuming the next print cycle sooner than otherwise possible.

Figure 4:
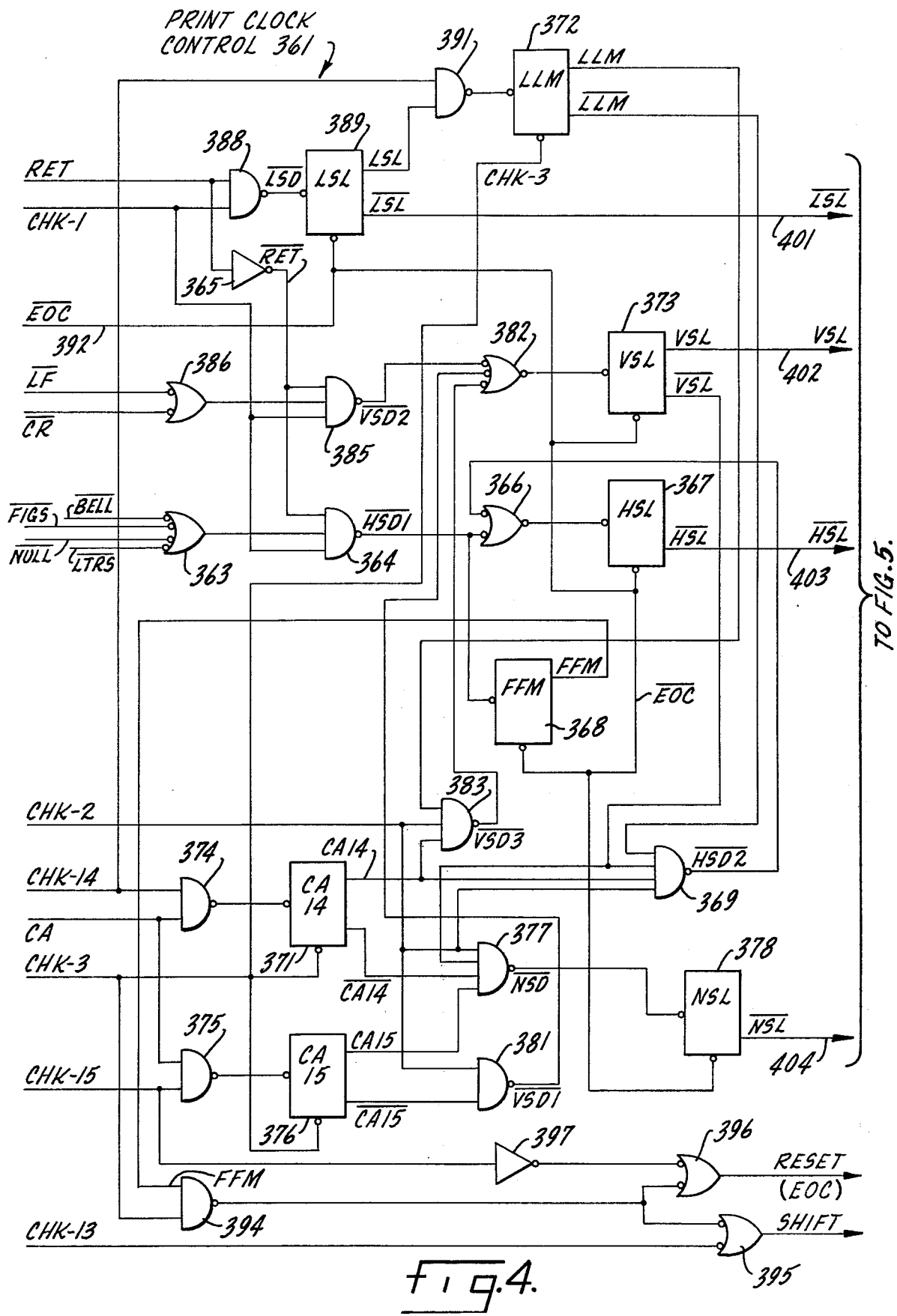
FIGS. 4 and 5 are detail logic schematic diagrams of a print rate control system constructed in accordance with one embodiment of the invention.
Figure 5:
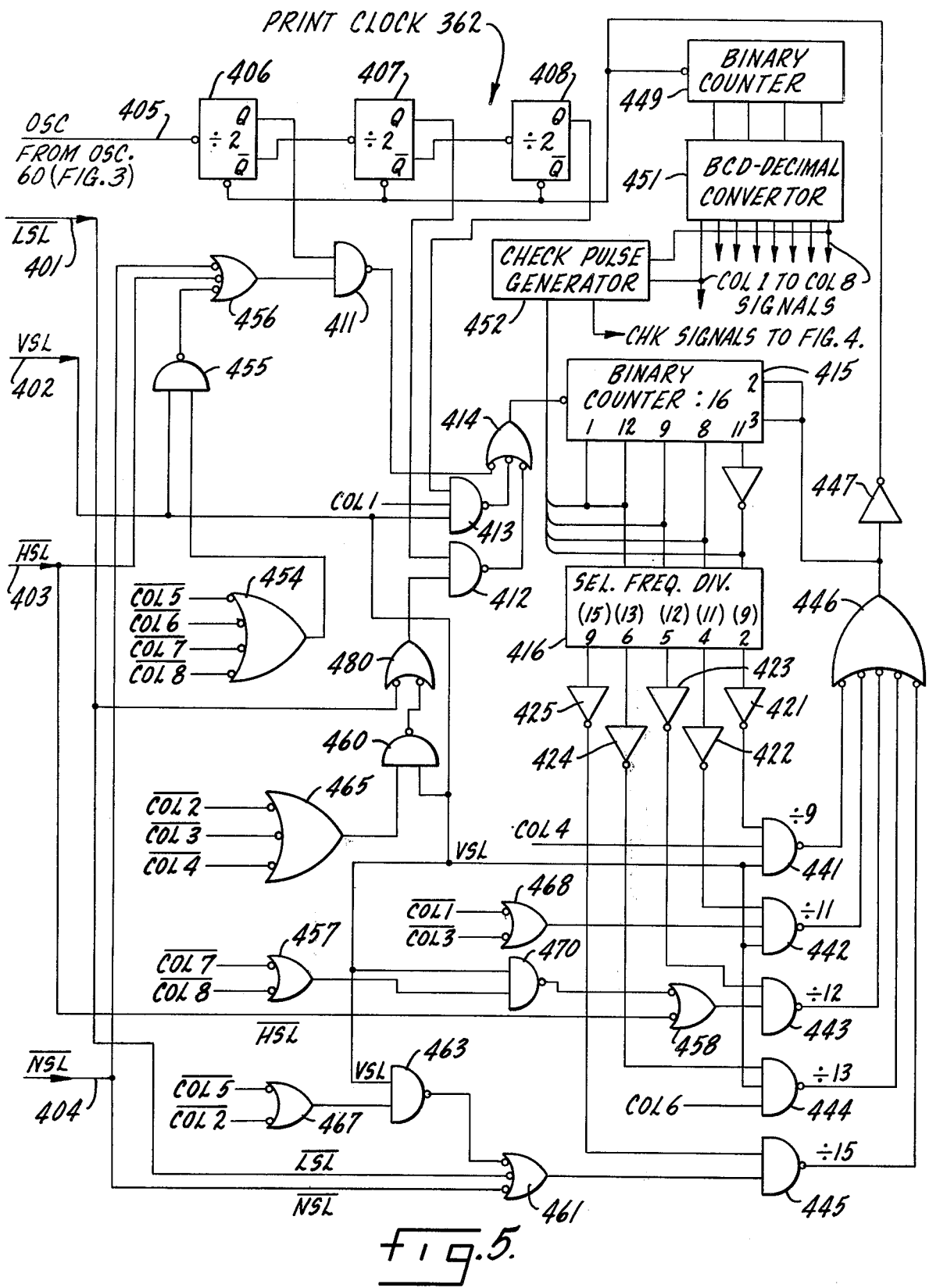

FIGS. 4–6 are employed to illustrate and explain one embodiment of the print rate control system of the present invention, which provides for effective undistorted operation of the printer at higher speeds than can be achieved when using the single or dual print rate controls of the prior art. In this embodiment of the invention, four different print rate timing signals are generated, providing four different basic modes of operation for the printer; of these four modes of operation, the critical mode is a variable speed (acceleration) mode.

HIGH SPEED MODE OF OPERATION - GENERAL

The print rate control system of FIGS. 4–6 applies a fast print rate timing signal to printer 10 to operate the printer in a high speed mode, substantially faster than the nominal receiving rate, whenever the following conditions apply:

A. The last previous character was a spacing character (figure, letter, or blank space) and the printer was in its high speed mode of operation at the time the carriage traversed the eighth column (column 48, FIG. 2) in the character matrix; and B. A new code word was available for output from the operational storage register (register 59, FIG. 3) at some predetermined time X (see FIG. 6) before the end of the eighth column in the previous character; and C. The new code word does not represent either a line feed or a carriage return function.

The print rate control system of FIGS. 4–6 also applies the fast print rate timing signal to the printer, for high speed operation, whenever the next character to be reproduced is representative of a "letters" or "figures" shift, a null function, or an auxiliary (bell) function. For these functions, however, operation in the high speed mode is maintained only for a limited time, much shorter than the eight column intervals for a spacing character. The print clock is then reset, information stored in input register 59 is advanced, other end-of-character operations of the printer control are carried out, and a new print cycle is initiated.

NORMAL SPEED MODE

The print rate control system of FIGS. 4–6 generates and applies a normal print rate timing signal to the printer, for operation at the nominal receiving rate, whenever the following conditions obtain:

A. The last character was a spacing character; and

B. A new code word was available at the output of storage register 59 at the end of the eighth column for the last character, time Y in FIG. 6, but was not available at time X.

VARIABLE SPEED MODE

For certain operating conditions, the print rate control system of FIGS. 4–6 generates a variable print rate timing signal in which the time intervals for successive column count (stepping) pulses are progressively decreased, thereby providing a gradual acceleration of the printer carriage. In general, operation in the variable speed mode is effected for printing of just one character (or movement through one blank space) and is utilized whenever the printer carriage has been at rest for at least one column time at the normal print rate. More specifically, the variable speed mode of operation is employed for each of the following circumstances:

A. Immediately following any line feed or carriage return function; or

B. Whenever the last operation of the printer constituted a re-engagement of the gear train in the carriage drive; or C. Whenever there was no new code word available at the output of storage register 59 at time Y.

LOW SPEED MODE

The electronic print rate control system of FIGS. 4–6 provides for the generation of a low-frequency print rate timing signal to be supplied to the stepping motor for its initial forward movement to re-engage the gear train in the carriage drive. This low speed timing signal is employed only following engagement of the carriage with the left-hand switch 31 (FIG. 1) in the course of a carriage return movement. This particular timing signal may be unnecessary in printers which do not utilize a comparable connection in the carriage drive.

PRINT CLOCK CONTROL 361 (FIG. 4)

FIG. 4 illustrates a print clock control circuit 361 for a print rate control system having four different operational speeds, as generally described immediately above, and is used in conjunction with the print clock circuit 362 illustrated in FIG. 5.

One of the inputs to print clock control 361 is an inverting OR gate 363 having four individual inputs. One input to gate 363 is derived from the $\overline{\text{BELL}}$ output of the auxiliary function or bell detector 76 (FIG. 3). The remaining three inputs to gate 363 are taken from other non-print function detector circuits (not illustrated specifically in FIG. 3) affording signals which identify code words representative of figures shift ($\overline{FIGS}$), letters shift ($\overline{LTRS}$) and null ($\overline{NULL}$) functions for the printer.

The output of gate 363 is connected to one input of an inverting AND gate 364 which has two additional inputs. One of these inputs is a check signal CHK-1 derived from a check pulse generator 452 (FIG. 5). The timing of the CHK-1 signal relative to a complete operation of the print clock is described hereinafter in connection with FIG. 10. The third input to gate 364 is a return ($\overline{RET}$) signal that is available continuously during each carriage return operation, the $\overline{RET}$ signal being applied to gate 364 through an inverter 365.

Gate 364 functions as a detector for high speed printer operation; the output of the gate is designated as $\overline{HSD1}$ and is connected to one input of an OR gate 366. The output of gate 366 is connected to the "set" input of a high speed latch, the flip-flop 367. The $\overline{HSD1}$ output of gate 364 is also connected to the set input of a flip-flop 368 used as a fast function memory.

Gate 366 has a second input which is connected to the output of an inverting AND gate 369 that functions as another high speed detector; the output signal from gate 369 is designated as $\overline{HSD2}$. One of the inputs to gate 369 is a timing signal, the CHK-2 signal identified more fully in connection with FIG. 6. Another input to gate 369 is derived from one output of a first character-available latch circuit, the flip-flop 371. A third input to gate 369 is an inhibit signal derived from one output ($\overline{LLM}$) of a low speed latch memory, the flip-flop 372. A fourth input to gate 369 is derived from one output ($\overline{VSL}$) of a variable speed latch, the flip-flop 373.

The set input to the character-available latch 371 is connected to the output of an inverting AND gate 374. One input to gate 374 is a character-available (CA) signal indicative of the presence of a code word in the output stage of storage register 59. Thus, signal CA is analogous to the signal that is used in the two-speed control system of the aforementioned Fulton application to identify the presence of a code word recorded in the penultimate stage of the storage register. In the embodiment of the present invention illustrated in FIGS. 4 and 5, however, the signal indicative of the availability of a new code word is taken from the final stage of the input storage register 59, due to a change in timing of the storage register. The second input to gate 374 is a check signal CHK-14, employed as a timing signal.

In print clock control 361 (FIG. 4), the character-available signal CA is also applied to one input of an inverting AND gate 375. A timing signal CHK-15 is applied to a second input to gate 375. The output of gate 375 is connected to the set input of a flip-flop 376 constituting another character-available latch.

An inverting AND gate 377 is incorporated in print clock control 361 and functions as a normal speed detector, with an output $\overline{NSD}$. One input to gate 377 is derived from one output $\overline{CA14}$ of the character-available latch 371. A second input to gate 377 is taken from an output CA15 of the other character-available latch 376. The CHK-2 signal is supplied to another input of gate 377 as a timing signal. Gate 377 has a fourth input that is connected to the same output ($\overline{VSL}$) of the variable speed latch 373 that is coupled to gate 369. The output of gate 377 is connected to the set input of a flip-flop 378 which functions as a normal speed latch circuit.

There are three variable speed detector circuits in print clock control 361 (FIG. 4); each is employed to detect the existence of one of the three conditions set forth above requiring utilization of a variable print rate signal to accelerate the printer from a rest condition. One of these variable speed detectors is an inverting AND gate 381, which has a first input connected to an output $\overline{CA15}$ of latch 376. The second input to gate 381 is a timing signal, the CHK-2 signal. The output $\overline{VSD1}$ from gate 381 is connected to one input of an OR gate 382. The output of gate 382 is connected to the set input of the variable speed latch 373.

Another variable speed detector is the inverting AND gate 383. One input to gate 383 is taken from the output CA14 of the character-available latch 371. Another input to gate 383 is connected to one output LLM of the low speed latch memory 372. The CHK-2 signal is applied to gate 383 as a timing signal. The output of gate 383, designated as $\overline{VSD3}$, is connected to an input of OR gate 382.

The remaining detector for variable speed operation comprises an inverting AND gate 385. One input to gate 385 is the $\overline{RET}$ signal, used to identify the continuance of a carriage return operation. A second input to gate 385 is derived from an inverting OR gate 386 which has one input $\overline{LF}$ derived from the line feed detector 75 and another input $\overline{CR}$ from the carriage return detector 74 (FIG. 3). A third input to gate 385 (FIG. 4) is a timing input, the CHK-1 signal. The output of gate 385, designated $\overline{VSD2}$, is applied to another input of OR gate 382.

An inverting AND gate 388 serves as a low speed detector in print clock control 361. The RET signal is applied to one input of gate 388. The other input to gate 388 is a timing signal, the CHK-1 signal. The output of gate 388 is connected to the set input of a low speed latch circuit, the flip-flop 389.

One output LSL of latch 389 is connected to a first input of an inverting AND gate 391. The CHK-14 signal is supplied to a second input of gate 391 as a timing signal. The output of gate 391 is connected to the set input of the low speed latch memory 372.

An additional input to print clock control 361 is provided on the line 392. This circuit supplies an end-of-character signal ($\overline{EOC}$) generated in the printer and coincidental in time with the CHK-13 signal identified hereinafter in connection with FIG. 6. The $\overline{EOC}$ signal on line 392 is applied to the reset terminals of the low speed latch 389, the variable speed latch 373, the high speed latch 367, the fast function memory latch 368, and the normal speed latch 378. The CHK-3 signal is also utilized as a reset signal for a number of the latches in control 361; it is coupled to the reset inputs of the low speed latch memory 372 and the two character-available latches 371 and 376.

An AND gate 394 in control 361 (FIG. 4) is utilized as a fast function detector. Gate 394 has one input connected to an output FFM of the fast feed memory latch 368. The timing input to gate 394 is the CHK-3 signal. The output of gate 394 is connected to one input of an inverting OR gate 395 that is connected back to storage register 59 (FIG. 3) to supply a shift signal to the storage register. A second input to OR gate 395 is the CHK-13 signal.

The output of gate 394 is also connected to one input of an inverting OR gate 396. A second input to gate 396 is derived from the CHK-15 input, through an inverter 397. The output of gate 396 is a reset signal that is supplied to the control circuits of the printer normally actuated in response to an end-of-character signal; thus, the output of gate 396 is ultimately connected back to line 392.

PRINT CLOCK 362 (FIG. 5)

The print clock 362 illustrated in FIG. 5 actually includes the circuits, for this embodiment of the invention, that perform the basic functions of the print clock 62, binary counter 63, check detector 64, column count control 66, and converter 68 in the main block diagram of the overall control system (FIG. 3). Print clock 362 has four print rate control inputs 401, 402, 403, and 404 from print clock control 361 (FIG. 4). Input 401 is the low speed control input ($\overline{LSL}$); circuit 402 is the variable speed control input (VSL); line 403 is the high speed control input ($\overline{HSL}$); and circuit 404 is the normal speed control input ($\overline{NSL}$).

The basic timing input to print clock 362 is derived from a crystal-controlled oscillator (e.g., oscillator 60, FIG. 3). In this particular system, the oscillator frequency is taken as 115,200 Hz., as explained more fully in connection with FIG. 6. However, the oscillator frequency may be selected to meet the design parameters of the desired printer operation including particularly the normal and high speed print rates. The oscillator input, on line 405, is connected to the set input of a flip-flop 406 employed as a simple frequency divider having a division factor of two. The $\overline{Q}$ output of flip-flop 406 is connected to the set input of a second frequency divider flip-flop 407. The $\overline{Q}$ output of flip-flop 407, in turn, is connected to the set input of a third flip-flop 408 also employed as a frequency divider with an effective division factor of two.

The Q output of flip-flop 406 is connected to one input of an inverting AND gate 411. The output of gate 411 is connected to one input of an inverting OR gate 414. The Q output of flip-flop 407 is connected to one input of an inverting AND gate 412 having its output connected to a second input of gate 414. Similarly, the Q output of flip-flop 408 is connected to one input of an inverting AND gate 413, the output of gate 413 being connected to a third input for gate 414. The output of gate 414 is connected to the set input of a binary counter 415 that functions as a frequency divider having a division factor of sixteen.

The outputs of binary counter 415 are connected to a BCD-decimal converter 416 utilized as a selective frequency divider. Five different outputs are taken from circuit 416, through the five inverters 421, 422, 423, 424 and 425 respectively. The effective division factors for these outputs are indicated in parentheses within the outline of circuit 416. That is, the output through circuit 421 provides for effective division of the input frequency by a factor of 9. On output 422 the division factor is 11, on output 423 the division factor is 12, on output 424 the division factor is 13, and on output 425 the frequency division is by a factor of 15.

The outputs 421–425 of the selective frequency divider 416 are individually connected to five inverting AND gates 441–445, respectively. Each of the gates 441–445 has an output connection to one of the inputs of an inverting OR gate 446. The output of gate 446 is connected to the reset inputs of binary counter 415. The output of gate 446 is also connected, through an inverter 447, to the reset inputs of each of the flip-flop circuits 406–408. The output of gate 446 is further connected to the input of a synchronous mode clock circuit 449 that is in turn connected to a BCD-decimal converter 451.

Circuit 451 has a total of eight outputs, on which are developed the column signals required to control the operation of step motor 28 and character generator 69 (see FIG. 3). These signals, the timing signals required for operation of the printer through the eight columns of a matrix (FIG. 2) are designated as signals COL 1 through COL 8.

The COL 1 and COL 8 outputs of converter 451 are connected to a check pulse generator 452, to which the output signals from binary counter 415 are also supplied. The check pulse generator 452 comprises a relatively simple set of gates used to generate the CHK signals referred to in connection with FIGS. 4 and 6. The logic required for this purpose is quite straightforward; accordingly, the details of check pulse generator 452 have not been shown in the drawings.

In the circuit of FIG. 5, the high speed control signal $\overline{HSL}$ on line 403 is connected to one input of an inverting OR gate 456. The column signals $\overline{COL\ 5}$ through $\overline{COL\ 8}$ are supplied to individual inputs of an inverting OR gates 454; these are column signals derived from circuit 451. The output of gate 454 is connected to one input of an inverting AND gate 455 having a second input (VSL) from line 402. The output of gate 455 is connected to a second input of gate 456. The output of gate 456 constitutes the second input to gate 411.

The $\overline{HSL}$ input 403 is also connected to one input of an inverting OR gate 458. The output of gate 458 is connected to a second input of gate 443.

The normal speed control input 404, in FIG. 5, is connected to a third input to gate 456. This $\overline{NSL}$ input, line 404, is also connected to one input of an inverting OR gate 461. The output of gate 461 constitutes a second input to gate 445.

The variable speed control input VSL, line 402, is directly connected to one input of each of the gates 413, 441, 442, and 444. The VSL line is also connected to one input of an inverting AND gate 463. The output of gate 463 constitutes a second input to gate 461. The VSL signal is also supplied to one input of an inverting AND gate. A second input to gate 460 is taken from an inverting OR gate 465 to which three column signals $\overline{COL\ 2}$, $\overline{COL\ 3}$, and $\overline{COL\ 4}$ are applied. The VSL signal is also applied to one input of an inverting AND gate 470 having its output connected to an input of gate 458.

The remaining control input to print clock 362, FIG. 5, is the low speed control input $\overline{LSL}$ on line 401. Line 401 is connected to one input of an inverting OR gate 480. Gate 480 has a second input from gate 460. The output of gate 480 is connected to a second input of gate 412. The low speed $\overline{LSL}$ input 401 is also connected to one input of gate 461.

There are some additional connections for applying the column signals derived from converter 451 to other units of the control logic illustrated in FIG. 5. Thus, a third input to gate 413 is the column count signal for the first column, COL 1. The inverse $\overline{COL\ 1}$ signal is supplied to one input of an inverting OR gate 468 that has a second input for the $\overline{COL\ 3}$ signal. The output of gate 468 is connected to a third input for gate 442. Gate 441 has a third input constituting the column signal COL 4. An inverting OR gate 457 has two inputs to which the column signals $\overline{COL\ 7}$ and $\overline{COL\ 8}$ are supplied; the output of gate 457 affords a second input to gate 470. The column signal COL 6 is connected to a third input for gate 444. The $\overline{COL\ 5}$ and $\overline{COL\ 2}$ are applied to the inputs of an inverting OR gate 467 connected to a second input of gate 463.

BASIC PRINT CYCLE TIMING (FIG. 6)

In each cycle of operation of the printer during which a spacing character is reproduced, it is necessary to generate eight column signals, one for each of the eight columns in the matrix forming a complete character (FIG. 2). In FIG. 6, these signals are identified as the column signals COL 1 through COL 8, two complete character cycles being illustrated. The column signals define a total of eight column step intervals, the eighth column step being terminated at time Y (FIG. 6) independently of the initiation of the next cycle.

For effective timing of the printer during its varying operational cycles, it is also necessary to develop the check signals referred to above in connection with FIG. 4. The relative timing of these check signals is also shown in FIG. 6. During the first one-sixteenth of the COL 1 interval, seven check signals CHK-1 through CHK-7 may be generated. To meet the operational needs of FIG. 4, only the CHK-1, CHK-2, and CHK-3 signals are required. However, a different selection of the various check signals could be made for the operation of FIG. 4. Furthermore, some of the other check signals in the series CHK-1 through CHK-7 may be required in connection with other facets of the printer operation not pertinent to the present invention.

During the eighth column step interval, COL 8 (FIG. 6), an additional series of check signals CHK-8 through CHK-15 are developed by the check pulse generator 452 (FIG. 5). The CHK-13, CHK-14, and CHK-15 signals are utilized in timing the operations of the print clock control 361, FIG. 4. As in the case of the check signals generated at the beginning of the character cycle, the check signals CHK-8 through CHK-15 may be required to control some operations of the printer that are not relevant to the present invention. Furthermore, the selection of the particular check signals employed to actuate and time the operations of the print clock control may be varied. For example, the time X at which availability of a code word in the output stage of storage register 59 is first checked need not necessarily be coincident with signal CHK-14. The signal CHK-13 could be used instead, in which case the shift timing controlled by signal CHK-13 in the illustrated system would be changed to coincide with one of the earlier check signals CHK 8-12.

For the print rate control system of FIGS. 4-6, if it is assumed that the nominal input rate for information received by the printer is 30 characters per second, the normal print rate would be selected to coincide with this input rate. For normal speed operation on a continuous basis, therefore, with eight columns per character, the frequency of the column signals COL 1 through COL 8 would be 240 Hz. With an oscillator frequency of 115,200 Hz., as noted above, the oscillator frequency is divided by a total divisor of 480, entailing division by a factor of two in circuit 406, by a factor of 16 in counter 415, and by a factor of 15 in selective frequency divider 416 (FIG. 4). Thus, for operation in the normal speed mode, the duration of each of the column step intervals COL 1 through COL 8, FIG. 6, is 0.0043 seconds.

For operation in the high speed mode, the printer should function at a rate substantially higher than for normal speed operation. For example, the high speed print rate may be taken as 37.5 characters per second. For this mode of operation, therefore, the step rate or frequency for the column signals COL 1 through COL 8 (FIG. 6) is 300 Hz., requiring division of the fundamental oscillator frequency by a factor of 384. This is accomplished in print clock 362 (FIG. 5) by division by a factor of two in circuit 406, a factor of 16 in counter 415, and a factor of 12 in circuit 416. The duration of the individual column step intervals, (FIG. 6) is again uniform and is 0.0033 seconds.

For the low speed mode of operation which, in the present system, is used only in restoring the drive train for the carriage, a nominal column step rate of 120 Hz may be selected, making each column step interval 0.0086 second. This requires a division factor of 960, relative to the oscillator frequency of 115,200 Hz, the stages of division being by a factor of two in circuit 406, a factor of two in circuit 407, a factor of 16 in counter 415, and a factor of 15 in circuit 416 (FIG. 5).

In the variable speed mode of operation, as discussed above, the column step intervals COL 1 through COL 8 (FIG. 6) are not uniform. That is, the gradual acceleration of the print head that is desired to order to avoid distortion in characters printed after the print head has been at rest, and that also avoids undue stress on the printer mechanism, requires that the first column step interval COL 1 be substantially longer than the eighth column step interval COL 8. Moreover, the decrease in interval length should be effected on a relatively smooth transitional basis. One usable set of parameters for variable speed operation is set forth immediately below in Table I. It may be noted that in Table I the timing indicated for column steps 2,5 and 8 coincide with the parameters given above for the low speed, normal speed, and high speed modes of operation, respectively.

TABLE I

VARIABLE-SPEED PARAMETERS

| COL Step | Char. per sec. | COL Step Rate (Hz) | Freq. Divisor | Division Factors | COL interval (sec.) |
|---|---|---|---|---|---|
| 1 | 10.23 | 81.82 | 1408 | 16·11·2·2·2 | .0124 |
| 2 | 15 | 120 | 960 | 16·15·2·2 | .0086 |
| 3 | 20.45 | 163.64 | 704 | 16·11·2·2 | .0062 |
| 4 | 25 | 200 | 576 | 16·9·2·2 | .0050 |
| 5 | 30 | 240 | 480 | 16·15·2 | .0043 |
| 6 | 34.62 | 276.92 | 416 | 16·13·2 | .0036 |
| 7 | 37.5 | 300 | 384 | 16·12·2 | .0033 |
| 8 | 37.5 | 300 | 384 | 16·12·2 | .0033 |

PRINT RATE SELECTION (FIGS. 4, 6)

As shown in FIG. 6, the CHK-1 signal is generated very shortly after initiation of each cycle of the print clock 362. At the time of occurrence of the CHK-1 signal, a number of different actions may occur in print clock control 361, depending upon operational conditions in preceding cycles for the printer.

When the CHK-1 signal occurs, the printer may be performing a carriage return operation. Under these circumstances, the RET signal input to print clock control 361 (FIG. 4) is logically true of "high" and constitutes an enabling signal for gate 388. Accordingly, gate 388 is actuated by the CHK-1 signal and produces an output signal $\overline{LSD}$ that represents a logical "false" or "low" condition. The low $\overline{LSD}$ signal sets the low speed latch, flip-flop 389. As a consequence, the LSL output of latch 389 goes high and the $\overline{LSL}$ output goes low. The high LSL output affords an enabling signal to gate 391 that is utilized at a subsequent time. The low $\overline{LSL}$ output on line 401 constitutes a low speed control signal that is applied to print clock 362 to establish the print clock in its low mode of operation. The low speed latch, flip-flop 389, remains in its set condition until reset by an $\overline{EOC}$ signal on line 392.

At the time of occurrence of the CHK-1 signal, if the printer is performing a carriage return operation, and the RET input is high, as described above, gates 364 and 385 are inhibited by the $\overline{RET}$ output from inverter 365. However, when the printer is not performing a carriage return, gates 364 and 385 may be effective to establish either a high speed or a variable speed mode of operation for the printer, depending upon other input signals.

Thus, if the code word stored in the output stage of storage register 59 is a line feed code, the $\overline{LF}$ input to gate 386 will be a logical low signal. Similarly, if that code word represents a carriage return, the $\overline{CR}$ input to gate 386 will be low. The $\overline{RET}$ input to gate 385 is high since there is no carriage return operation in progress. Thus, for either a low $\overline{LF}$ or low $\overline{CR}$ condition, the CHK-1 signal input to gate 385 actuates the gate and its output $\overline{VSD2}$ goes low.

The low $\overline{VSD2}$ from gate 385 is transmitted through OR gate 382 without inversion and is applied to the variable speed latch 373 to set the latch. The $\overline{VSL}$ output of latch 373 goes low, supplying inhibit signals to gates 369 and 377 to preclude operation in the high speed or normal speed modes. The VSL output of latch 373 goes high; this constitutes a variable speed control signal that is supplied to print clock 362 on line 402 to cause the printer to perform its next print cycle in the variable speed mode.

At the time of the CHK-1 signal, a code word representative of a letter shift, a figure shift, a bell, or a null operation may have been recorded in the output stage of storage register 59. Under these circumstances, one of the inputs to gate 363 is low, indicating that the next function required of the printer entails less than a normal print cycle even at the high speed rate of operation. In this regard, it should be noted that a shift from figures to letters is an electronic function and does not require any physical change in the printer mechanism.

Under these circumstances, with no carriage return operation in progress, all three inputs to gate 364 are high and the output $\overline{HSD1}$ from this gate goes low. The low $\overline{HSD1}$ signal is applied to the high speed latch, flip-flop 367, through OR gate 366, and sets the latch. This produces a low $\overline{HSL}$ on line 403, which is applied to the print clock (FIG. 5) to establish the print clock in its high speed mode of operation. The low $\overline{HSD1}$ signal is also applied to the fast function memory latch 368 (FIG. 4) to set that latch, producing a high FFM signal supplied to gate 394 as an enabling signal for operations occurring at a subsequent time, CHK-3.

As indicated in FIG. 6, the next timing signal supplied to the print clock control 361 of FIG. 8 is the CHK-2 signal that also occurs early in the first column step interval COL 1, after the CHK-1 signal. The CHK-2 signal may actuate control 361 (FIG. 4) to provide for either high speed or variable speed mode operations, depending upon other input conditions.

The CHK-2 signal is applied to the high speed detector gate 369 as an enabling signal. Another input to gate 369 is the CA14 signal from the character available latch 371; if the CA14 signal is high it indicates that a code word was available in the output stage of storage register 59 at the time of the check signal CHK-14 (time X, FIG. 6) in the previous operating cycle for the printer. This indicates that code words are accumulating or have accumulated in the storage register and that high speed operation may be desirable.

The $\overline{VSL}$ signal supplied to gate 369 from the variable speed latch 373 may also be high, indicating that the printer has not been established in the variable speed mode of operation. Furthermore, the $\overline{LLM}$ input to gate 369 from the low speed latch memory 372 may also be high, indicating that the previous cycle of operation has not been in the low speed mode. It is not desirable to go directly from the low speed mode to the high speed mode.

Under these circumstances, all of the inputs to gate 369 are high and its output $\overline{HSD2}$ goes low. The low $\overline{HSD2}$ is supplied to the high speed latch 367 through OR gate 366 and sets the high speed latch. Consequently, the $\overline{HSL}$ output of latch 367 goes low to actuate the print clock into operation in the high speed mode.

Occurrence of the CHK-2 signal may also actuate the variable speed detector gate 381 to establish the printer in its variable speed mode of operation. Thus, if the output $\overline{CA15}$ of latch 376 is high, indicating that no code word was available in the output of storage register 59 at the CHK-15 time (time Y) in the prior cycle, the CHK-2 signal actuates gate 381 and its output $\overline{VSD1}$ goes low.

The low $\overline{VSD1}$ signal is applied to the set input of the variable speed latch 373, through OR gate 382, and sets latch 373, producing a high VSL output that actuates the print clock to its variable speed mode. In addition, the $\overline{VSL}$ output of latch 373 goes low to preclude actuation to the high speed or normal speed modes by applying inhibiting signals to gates 369 and 377.

Under other circumstances, the CHK-2 timing signal may actuate gate 383, again establishing the printer in its variable speed mode of operation. To actuate gate 383, the LLM input from the low speed latch memory 372 must be high, indicating that the printer was previously in its low speed mode of operation. The input CA14 to gate 383 must also be high, indicating that the character-available latch 371 has been set because a code word was available in the output stage of the storage register at the CHK-14 time in the previous operating cycle. Under these circumstances, the CHK-2 signal actuates gate 383, producing a low output signal $\overline{VSD3}$ that operates the variable speed latch 373 in the same manner as described above.

AT the CHK-2 time, the print clock control 361 (FIG. 4) may also be actuated to place the printer in the normal speed mode of operation. To normal speed detector gate 377 receives a high enabling input $\overline{CA14}$ from the character-available latch 371 when no code word was available in the output stage of the storage register at the CHK-14 time in the prior operating cycle. Gate 377 will also receive a high enabling input CA15 from the other character-available latch 376 if a code word was available in the output stage of the storage register at the end of the previous cycle (time Y, FIG. 6). If the VSL input to gate 377 from the variable speed latch 373 is also high, indicating that the printer is not to operate in the variable speed mode, then the CHK-2 signal actuates gate 377 and its output signal $\overline{NSD}$ goes low. This sets the normal speed latch 378 and produces a low $\overline{NSL}$ on line 404 that actuates the print clock 362 to normal speed operation.

As shown in FIG. 6, the CHK-3 signal also occurs in the early part of the first column step interval, at a time subsequent to the CHK-2 signal. As applied to FIG. 4, the CHK-3 signal resets each of the two character-available latches 371 and 376. It also resets the low speed latch memory, flip-flop 372. In addition, the CHK-3 signal may be employed, under certain operating circumstances, to terminate a print operating cycle for a "fast function" constituting one of the functions for which input signals are supplied to gate 363.

As described above, for any of the non-print functions that supply effective input signals to gate 363, the printer is actuated to high speed mode operation by gate 364, which also sets the fast feed memory latch 368 to provide a high FFM output to gate 394. Upon subsequent occurrence of the CHK-3 signal, therefore, gate 394 is actuated and supplies a low output to the reset and shift gates 396 and 395. The output of gate 396 goes high, producing a reset signal that is fed back to the $\overline{EOC}$ input 392 to reset many of the circuits of print clock control 361, particularly the high speed latch 367 and fast feed memory 368, thereby conditioning the print clock control for subsequent operations. In addition, the shift output of gate 395 goes high, applying a shift signal to storage register 59 to clear the output stage of the shift register and shift a new code word into that stage. In this manner, the operating cycles for functions such as figures and letter shift and the bell function are greatly shortened, providing for faster printing operation than would otherwise be possible.

The next check signal that is utilized in actuation of print clock control 361 (FIG. 4) is the CHK-13 signal that occurs near the end of the eighth column step interval (see FIG. 6). The CHK-13 signal is applied to the shift gate 395 to produce a shift signal that clears the output stage of the storage register 59 and advances all code words recorded in the input register by one stage. It is thus seen that, in this embodiment of the invention, any code words that have accumulated in the input register are shifted to bring a new code word to the output stage of the register before termination of a character reproduction or other operating cycle of the printer. The timing of this operation is different from that described in the aforementioned Fulton application, in which the shift of a new code word to the output stage of the storage register was deferred until completion of the prior cycle. With this change in timing, observations of the next code word are made when that code word is stored in the output stage of the storage register rather than in the penultimate stage.

The next check signal of significance is the CHK-14 signal that also occurs during the eighth column step interval (see FIGS. 4 and 6). The CHK-14 signal is a logical high signal that enables gate 391 in the input to the low speed latch memory 372. If the low speed latch 389 has been actuated at the CHK-1 time, as described above, gate 391 produces a low output signal that sets latch 372 and produces a high LLM output and a low $\overline{LLM}$ output. The high LLM output enables gate 383 for operation in the next cycle so that low speed mode operation will be followed by the variable speed mode. The low $\overline{LLM}$ output constitutes an inhibit signal for gate 369 and prevents changing to the high speed mode directly from the low speed mode.

At the time of the CHK-14 signal, if the CA signal applied to gate 374 is high, indicating the presence of a code word recorded in the output stage of storage register 59, gate 374 is enabled. Gate 374 then supplies a low set signal to the first character-available latch 371. Setting of latch 371 produces a high signal on its output CA14 to indicate that a code word was available in the output of the storage register at the CHK-14 time. Of course, if latch 371 is not set in this manner, the other output $\overline{CA14}$ remains high and indicates that no code word was available at the CHK-14 time. Utilization of the CA14 and $\overline{CA14}$ outputs is described above.

As shown in FIG. 6, the CHK-15 signal occurs at the time Y marking the completion of a printing cycle. In FIG. 6, the timing for signal CHK-15 is shown as coinciding with initiation of the COL 1 signal for the next succeeding cycle. This condition will be obtained when the printer is in substantially continuous operation. However, it should be recognized that there may be a time interval between the CHK-15 signal and the next COL 1 signal. Indeed, this time interval is indeterminate when the CHK-15 signal marks the termination of a printing cycle that coincides with an interruption in transmission of the beginning of a carriage return or line feed function.

The CHK-15 signal is an enabling signal for gate 375. If the CA signal input to gate 375 is also high, indicating the presence of a code word in the output stage of the storage register, gate 375 develops a low output. When latch 376 is set, its output CA15 goes high to indicate the availability of a code word at the end of the prior printing cycle. When latch 376 is not set at the CHK-15 time, the output $\overline{CA15}$ remains high and indicates that no new code word is available in the output of the storage register. These character-available signals are utilized as described above.

The CHK-15 signal is also applied to the reset gate 396 through inverter 397. As a consequence, an output signal is developed by gate 396, constituting a reset signal that is supplied in inverted form to line 392 as the $\overline{EOC}$ signal. However, the CHK-15 signal does not result in generation of a shift signal; it will be recalled that the shift function is effected at the CHK-13 time.

From the foregoing description, and from FIG. 4 itself, it will be apparent that there are just four different operating conditions possible for the outputs 401–404 that connect the print clock control 361 of FIG. 4 to the print clock 362 of FIG. 5. These four conditions are set forth in Table II, in which a plus sign (+) indicates a logical high condition and a minus sign (−) signifies a low condition:

TABLE II

| Mode of Operation | 401 $\overline{LSL}$ | 402 $\overline{VSL}$ | 403 $\overline{HSL}$ | 404 $\overline{NSL}$ |
|---|---|---|---|---|
| Normal Speed | + | − | + | − |
| High Speed | + | − | − | + |
| Variable Speed | + | + | + | + |
| Low Speed | − | − | + | + |

All other combinations of the various outputs on lines 401 through 404 are effectively precluded by the logic of the print clock control 361, FIG. 4.

PRINT CLOCK OPERATION (FIG. 4) NORMAL SPEED MODE

For normal speed operation, the low $\overline{\text{NSL}}$ signal from line 404, after inversion in gate 456, affords a high enabling signal to gate 411. Gate 411 also receives a series of signal pulses, at one-half the oscillator frequency, from the initial divided-by-two flip-flop 406. Gate 411 provides an output, in this instance a frequency of 57,600 Hz, which is inverted in gate 414 and applied to the input of the binary counter 415. Counter 415 functions as a frequency divider with a division factor of 16, so that the signal supplied to the selective frequency divider 416 is at 3600 Hz.

The low $\overline{\text{NSL}}$ signal on line 404 is also applied to gate 461 and, after inversion, affords a high enabling input to gate 445. This effectively selects the divided-by-fifteen output 425 of circuit 416, affording an input to gate 446 at a frequency of 240 Hz. The output of gate 446 periodically resets counter 415 and also actuates circuits 447, 449 and 451 to produce the column signals COL 1 through COL 8 at the desired intervals for normal speed operation. The output signal from gate 446 also resets each of the input flip-flops 406–408 at the desired column frequency for normal speed operation.

While operation in the normal speed mode continues, there are no effective outputs from gates 441, 442 or 444 to gate 446; each of these gates is inhibited because the VSL signal from line 402 is low. Gate 443 also remains blocked because $\overline{\text{HSL}}$ is high and VSL is low, inhibiting gate 470, so that there is no low input to gate 458 to afford a high enabling input to gate 443.

HIGH SPEED MODE

For high speed mode operation, the low $\overline{\text{HSL}}$ signal on line 403 (see Table II) passing through gate 456, supplies a high enabling signal to gate 411. Accordingly, as in the normal speed mode, the input to counter 415 is again at one-half the oscillator frequency and the effective frequency of the output signals from counter 415 to circuit 416 is 3600 Hz.

The $\overline{\text{HSL}}$ signal from line 403 is also applied to gate 443 as a high enabling signal, through inverting gate 458. This circuit provides for effective selection of the divide-by-twelve output 423 of the selective frequency divider 416; the input gate 446 is thus established at a frequency of 300 Hz. In this manner, the column signals COL 1 through COL 8 are generated at the desired intervals of 0.0033 seconds to afford a print rate of 37.5 characters per second as described above.

During operation in the high speed mode, gates 441, 442 and 444 are all inhibited by the low VSL signal supplied to each of these gates. Gate 445, on the other hand, has no enabling input from gate 461 because the $\overline{\text{NSL}}$ and $\overline{\text{LSL}}$ signals to gate 461 are both high and gate 463 is inhibited by the low VSL signal.

LOW SPEED MODE

For low speed mode operation, the low $\overline{\text{LSL}}$ signal from line 401 is inverted in gate 480 and is supplied to gate 412 as a high enabling signal. Gate 411, on the other hand, does not receive an enabling signal from gate 456; all inputs to gate 456 are high. Gate 413 is inhibited by the low VSL signal. Accordingly, the frequency of the input to counter 415, through gates 412 and 414, is equal to the oscillator frequency divided by 4; a first frequency division of two is performed in flip-flop 406 and a second division by two is effected in gate 407. Thus, the input to counter 415, for the stated oscillator frequency, is 28,800 Hz and the output to circuit 416 is 1800 Hz.

The low $\overline{\text{LSL}}$ signal from line 401 is inverted in gate 461 and is applied as a high enabling signal to gate 445. This effectively selects the divided-by-fifteen output 425 of the selective frequency divider 416. Accordingly, the input to gate 446, for low speed mode operation, is 120 Hz. During low speed operation, therefore, the column time intervals are each .0086 seconds, as specified above. As in the case of normal speed operation, gates 441, 442 and 444 are inhibited during the low speed mode by the low VSL signal. Gate 443, on the other hand, is inhibited by the input from gate 458 because the HSL input to gate 458 is high and the other input from gate 470 is also high, gate 470 being inhibited by its low VSL input.

VARIABLE SPEED MODE

For operation in the variable speed mode, the $\overline{\text{LSL}}$, VSL, $\overline{\text{HSL}}$ and $\overline{\text{NSL}}$ are all high. The sequence of operations, however, is more complex than in any of the modes described above.

At the start of the first column step interval, the COL 1 signal goes high, enabling gate 413. Because the VSL signal input to gate 413 from line 402 is also high, gate 413 is open. The third input to gate 413 is in the output from the third divide-by-two flip-flop 408, a step signal with a frequency equal to the oscillator frequency divided by eight. That is, the input to binary counter 415 is 14,400 Hz and the output to circuit 416 is 900 Hz. Gate 411 is presently inhibited by its input from gate 456; the $\overline{\text{HSL}}$ and $\overline{\text{NSL}}$ inputs to gates 456 are both high and the input from gate 455 is also high because gate 455 has no enabling input from gate 454 at this time, the $\overline{\text{COL 5}}$ through $\overline{\text{COL 8}}$ signals all being high. Furthermore, gate 412 is blocked because its input from gate 480 is low. This results from the fact that the $\overline{\text{LSL}}$ input to gate 480 is high and the input from gate 460 is also high because the $\overline{\text{COL2}}$, $\overline{\text{COL3}}$ and $\overline{\text{COL4}}$ inputs to gate 465 are all high.

To terminate the COL 1 signal for the first column step in the variable speed mode after an interval of 0.0124 sec. (see Table I), it is necessary to actuate gate 442 in the output logic for the selective frequency divider 416 and to maintain gates 441 and 443–445 unactuated. The VSL input to gate 442 is high and hence enabling. The input from gate 468 is also high, since the $\overline{\text{COL 1}}$ input to this inverting gate is low. Thus, gate 442 is actuated as required so that the output signal to gate 446 is at the desired column step rate of 81.82 Hz corresponding to a step interval of 0.0124 sec.

During this first column interval in the variable speed mode, gate 441 is inhibited because its COL 4 input is low. Gate 443 remains blocked because the input from gate 458 is low; this results from the fact that the $\overline{\text{HSL}}$ input to gate 458 is high and the other input from gate 470 is also high since gate 470 is maintained inhibited by a low input from gate 457, the $\overline{\text{COL 7}}$ and $\overline{\text{COL 8}}$ signals both being high. Gate 444 remains blocked because its COL 6 input is low.

When the first column interval in variable speed mode operation terminates, the COL 1 input to gate 413 goes low and inhibits that gate. At the same time, the $\overline{\text{COL 2}}$ input to gate 465 goes low, affording a high enabling input to gate 460. The VSL input to gate 460 is also high, producing a low input to gate 480 and hence a high enabling input to gate 412. Gate 411 remains blocked as described above. Accordingly, the input to binary counter 415 through gate 414 is now derived through gate 412 at the 28,800 Hz output frequency of the frequency divider gate 407.

Referring to Table I, it is seen that for this second column interval in variable speed operation, the divide-by-fifteen output gate 445 for the selective frequency divider 416 must be actuated; gates 441 through 444 should be blocked. The $\overline{COL\ 2}$ input to gate 467 is now low, producing a high enabling output to gate 463, which also receives a high VSL input from line 402. This produces a low input to gate 461, the inverted output being a high enabling input to gate 445. Moreover, the $\overline{COL\ 1}$ input to gate 468 is now high, so that gate 442 is inhibited. Gates 441, 443 and 444 remain inhibited as discussed above. Consequently, the input to gate 446 is at the required column step rate of 120 Hz, affording a second column interval of 0.0086 sec. (see Table I).

For the third column interval, the $\overline{COL\ 2}$ input to gate 465 goes high, but the $\overline{COL\ 3}$ input goes low so that the circuit comprising gates 465, 460 and 480 continues to supply an enabling input to gate 412. Gates 411 and 413 remain inhibited and the output frequency from device 415 to selective frequency divider 416 remains at 1800 Hz. For this third step in the variable mode of operation, gate 442 is again actuated and gates 441 and 443–445 are blocked. Gate 442 is actuated by the low COL 3 input to gate 468, which affords a high enabling input to gate 442. The step rate is 163.64 Hz and the column interval is 0.0062 sec. During this interval, the $\overline{COL\ 2}$ input to gate 467 is high so that a low input is applied to gate 463 and blocks that gate, precluding actuation of gate 445 through gate 461. Gates 441, 443 and 444 remain blocked as described above.

When the third column interval in variable speed mode operation ends and the fourth column step begins, the $\overline{COL\ 3}$ input to gate 465 goes high but the $\overline{COL\ 4}$ input goes low. Accordingly, gate 412 remains enabled by the input through the circuit comprising gates 465, 460 and 480. Thus, the input to counter 415 again is from gate 412 at 28,800 Hz. Gates 411 and 413 remain blocked as explained above.

For this fourth column step, gate 441 is enabled and gates 442–445 are blocked. Gate 441 receives two high enabling signals, since the COL 4 input is high and the VSL input is also high. This effectively selects the divide-by-nine gate 441 for operation, supplying an input to gate 446 after an interval of .005 sec. as required for this column step (Table I). Gate 442 is inhibited because it receives no enabling input from gate 468, the $\overline{COL\ 1}$ and $\overline{COL\ 3}$ signals both being high. Gates 443–445 remain blocked for the reasons set forth below.

At the end of the fourth column step and beginning of the fifth column step, the $\overline{COL\ 4}$ signal goes high and the $\overline{COL\ 5}$ signal goes low. With a high $\overline{COL\ 4}$ signal, gate 465 does not produce a high enabling signal for gate 460, interrupting the previous enabling input to gate 412. Throughout the remainder of the variable speed cycle, gate 412 remains inhibited. The low $\overline{COL\ 5}$ input to gate 454, on the other hand, results in the application of a high enabling input to gate 455, which also receives a high VSL input from line 402. Accordingly, gate 455 supplies a low input to gate 456, which in turn applies a high enabling input to gate 411.

Throughout the remainder of the variable speed operating cycle, gate 411 remains enabled because each time one of the inputs to gate 454 reverts from low to high, the next column signal input in the sequence goes low. Thus, for the fifth through eighth column steps in the variable speed mode operation, the input to binary counter is at one-half the oscillator frequency, in this instance 57,200 Hz and the output from binary counter 415 is 3600 Hz.

For the fifth column step, the divide-by-fifteen gate 445 is actuated and gates 441 through 444 are blocked. The enabling signal to gate 445 results from the low $\overline{COL\ 5}$ input to gate 467, inverted in gate 463 and again inverted in gate 461 to afford a high enabling input to gate 445. None of the other gates 441 through 444 has a complete complement of high enabling inputs. Accordingly, the input to gate 446 is at a rate of 3600 Hz divided by a factor of 480 and hence has the requisite column step frequency of 240 Hz to produce a column interval of 0.0043 sec. (Table I).

For the sixth column step, the only change is to enable gate 444 and block gate 445. At the end of the fifth column interval the $\overline{COL\ 5}$ input to gate 467 goes high. Accordingly, there is no enabling input to gate 463 from gate 467; the output from the next gate 461 goes low and gate 445 is not enabled. On the other hand, the COL 6 input to gate 444 goes high, enabling this gate and effectively providing an input to gate 446 at a frequency of 3600 Hz divided by 13, the required step rate of 276.92 for the desired column interval of 0.0036 sec. (Table I).

For the seventh and eighth column steps in the variable speed mode, timing is the same as for high speed mode operation. This entails enabling gate 443 and inhibiting gate 444. For each of the seventh and eighth column steps, there is a low input to gate 457, affording a high enabling input to gate 470, which also receives a high VSL input. Consequently, gate 470 produces a low input to gate 458 that is inverted and affords a high enabling input to gate 443. This affords the step rate of 300 Hz and column intervals of 0.0033 sec. On the other hand, the COL 6 input to gate 444 goes low and inhibits gate 444.

The control system illustrated in FIGS. 4 and 5 can be readily implemented in TTL form, using 7400 series components. More specifically, the various flip-flops (367, 368, 371–373, 376, 378, 389, 406–408) may be type 74107; convertors 416 and 451 may be type 7442; device 449 may be type 74161; and counter 415 may be type 7493. Types 7400, 7410 and 7420 are most readily used for the various gates in the control.

Of course, the control logic (FIGS. 4,5) is subject to substantial variations and transformations depending upon the preferences of the designer. Furthermore, an appropriately programmed mini-processor unit can be employed to replace most or all of the individual gates, counters, and other devices in the system without changing the basic operation of the print rate control.

The specific parameters set forth in connection with the given example of the invention can be changed to meet operational requirements. Thus, the print rate for the high speed mode of operation may be made much higher in relation to the normal speed mode, if conditions warrant; a fast print rate of 60 characters per second can be used in conjunction with a normal print rate of 30 cps, with appropriate adjustment of the variable mode column step intervals for relatively smooth acceleration. A change in oscillator frequency can be used to adjust the normal print rate with an automatic change in all other print rates. Thus, if the oscillator frequency is made 96,00 Hz, the normal rate becomes 25 cps, the fast rate is changed to 31.25 cps, and the variable rate ranges from 8.5 to 31.25 cps, with no change required in the control or print clock logic. By the same token, if the oscillator frequency is increased to 134,400 Hz, effective operation at a normal print rate of 35 cps is obtained, with no logic revisions required.

I claim

1. An electronic print rate control system for a high speed column-sequential dot matrix printer utilizing a permutation code data input signal comprising a sequence of code words which, in continuous operation, occur at a given maximum receiving rate, the printer comprising: a print head and a print head drive for moving the print head through a sequence of a given number of column steps, in each print cycle, at a speed controlled by a print rate timing signal which also controls other printer functions; an operational storage register including a plurality of stages each capable of storing a code word; input means for recording each received code word in the storage register; and output means for reading code words from the register in the same sequence as recorded therein; the print rate control system comprising:

print clock means for generating:
a normal print rate timing signal of given normal frequency to actuate the printer to reproduce spacing characters at a normal print rate approximately equal to the maximum receiving rate,
a fast print rate timing signal, having a frequency higher than the normal frequency, to actuate the printer to reproduce spacing characters at a fast print rate, substantially faster than the normal print rate, and
a variable print rate timing signal progressively increasing in frequency from an initial frequency substantially lower than the normal frequency to a final frequency at least as high as the normal frequency, during a limited number of print cycles;

and print clock control means, connected to the timing signal generating means and to the printer, for applying one of the print rate timing signals to the printer during each print cycle, each in accordance with different predetermined operating conditions of the printer at the beginning of the print cycle, the print clock control means applying the variable print rate timing signal to the printer for print cycles in which a spacing character is reproduced following an interval in which the print head has been at rest.

2. A print rate control system for a column-sequential dot matrix printer, according to Claim 1,
in which the print clock control means includes a first character-available detector means for detecting the presence of a code word in a given stage of the storage register at a time Y approximately coincident with the end of the preceding print cycle,
and in which the print clock control means applies the variable print rate timing signal to the printer whenever the preceding cycle has been completed with no new code word detected in the given stage of the storage register at time Y.

3. A print rate control system for a column-sequential dot matrix printer, according to Claim 2,
in which the print clock control means includes a second character-available detector means for detecting the presence of a code word in the given stage of the storage register at a time X near the end of the preceding print cycle, prior to time Y,
in which the print clock control means further includes means for distinguishing between spacing characters and other machine functions,
and in which the print clock control means applies the normal print rate timing signal to the printer for each spacing character print cycle when the preceding cycle included reproduction of a spacing character, no code word was recorded in the given stage of the storage register at time X, and a code word for a spacing character was recorded in the given stage of the storage register at time Y.

4. A print rate control system for a column-sequential dot matrix printer, according to Claim 3,
in which the print clock control means applies the fast print rate timing signal to the printer when the preceding cycle included reproduction of a spacing character and a code word for a spacing character was recorded in the given stage of the storage register at times X and Y.

5. A print rate control system for a column-sequential dot matrix printer, according to Claim 3,
in which the print clock control means includes means for identifying carriage return and line feed operations of the printer,
and in which the print clock control means applies the variable print rate timing signal to the printer for each spacing character print cycle following completion of a line feed or carriage return operation.

6. A print rate control system for a column-sequential dot matrix printer, according to Claim 1, in which the storage register comprises a shift register, and further comprising:
shift means to clear the output stage of the storage register and advance a new code word thereto, if available, during the last column step in each print cycle of the printer;
and in which the print clock control means selects the print rate timing signal for use in the next print cycle in accordance with the presence or absence of a code word recorded in the output stage of the storage register after actuation of the shift means and prior to termination of the last column step in the preceding print cycle.

7. A print rate control system for a column-sequential dot matrix printer, according to Claim 1, and further comprising:
slow timing signal generating means for generating a slow print rate timing signal, having a frequency substantially less than the normal frequency;
and in which the print clock control means includes means for applying the slow print rate timing signal to the printer, to the exclusion of the other print rate timing signals, for a given non-print printer function.

8. A print rate control system for a column-sequential dot matrix printer, according to Claim 1, in which the print clock control means comprises a plurality of detector means including means for detecting each of the following conditions:
A. the preceding print cycle provided reproduction of a spacing character;

B. a new code word was recorded in a given stage of the storage register at a time Y approximately coincident with the end of the last column step of the preceding print cycle;

C. a new code word was recorded in said given stage of the storage register at a time X, prior to time Y, during the last column step of the preceding print cycle; and D. a new code word recorded in the given stage of the storage register represents a line feed or carriage return function for the printer;

and in which the print clock control means comprises the following means, each operable for spacing character print cycles:

means for applying the normal print rate timing signal to the printer for conditions A and B but not conditions C or D;

means for applying the fast print rate timing signal to the printer for conditions A, B and C but not condition D; and means for applying the variable print rate timing signal to the printer in the absence of condition B, independently of conditions A, C and D.

9. A print rate control system for a column-sequential dot matrix printer, according to Claim 8, in which the print clock control means comprises an additional detector for detecting the following condition:

E. a new code word recorded in the given stage of the storage register represents a non-print function other than a carriage return or line feed;

and in which the print clock control means includes means for applying the fast print rate timing signal to the printer upon deetection of condition E, but not condition D, independently of conditions A, B and C.

10. A print rate control system for a column-sequential dot matrix printer, according to Claim 8, in which the storage register comprises a shift register, and further comprising:

shift means to clear the output stage of the storage register and advance a new code word thereto, if available, during the last column step in each print cycle of the printer prior to time X;

and in which the given stage of the storage register referred to in conditions B and C is the output stage thereof.

11. A print rate control system for a column-sequential dot matrix printer, according to Claim 8, in which the printer includes an oscillator having an operating frequency many times higher than the pulse rate of the data input signal, and in which the print clock means for generating the normal, fast, and variable timing signals comprises a plurality of countdown circuits connected to the oscillator.

12. A print rate control system for a column-sequential dot matrix printer, according to Claim 8, in which the print clock control means includes means for applying the variable print rate timing signal to the printer following condition D, independently of conditions A, B and C.

13. A print rate control system for a column-sequential dot matrix printer, according to Claim 1, in which the print clock control means further includes means for identifying any one of a plurality of non-print functions other than a carriage return or a line feed, prior to a cycle in which the function is performed, and in which the print clock means includes means for applying the fast print rate timing signal to the printer for each print cycle in which one of those specific non-print functions is performed.

14. A print rate control system for a column-sequential dot matrix printer, according to Claim 1, in which the print clock control means further comprises:

means for identifying any one of a plurality of specified non-print functions other than a carriage return or a line feed;

and fast function reset means for substantially reducing the number of column steps in each cycle in which one of the specified non-print functions is performed.

15. A print rate control system for a column-sequential dot matrix printer, according to Claim 14, in which the fast function reset means resets the print clock control means during the first column step in each cycle in which one of the specified non-print functions is performed.

16. The method of controlling the print rate of a high speed column-sequential dot matrix printer actuated by an input signal comprising a sequence of code words occurring at a maximum input rate, the printer comprising a print head, a print head drive for moving the print head through a number of column steps in a print cycle at a speed controlled by a print rate timing signal, and a multi-stage storage register, each stage capable of storing a complete code word, comprising the following steps:

generating at least two print rate timing signals of constant frequency, including a normal print rate timing signal at a normal frequency to actuate the printer at a normal print rate approximately equal to the maximum input rate and a fast print rate timing signal at a high frequency substantially higher than the normal frequency;

generating a variable print rate timing signal progressively increasing in frequency from an initial frequency below the normal frequency to a final frequency at least as high as the normal frequency;

and selectively applying the print rate timing signals to the printer to control the rate of reproduction of spacing characters in accordance with different operating conditions for the printer, including applying the variable print rate timing signal to the printer during a print cycle in which a spacing character is reproduced following an interval in which the print head has been at rest.

17. The method of controlling the print rate of a column-sequential dot matrix printer, according to Claim 16, including applying the fast print rate timing signal to the printer during a print cycle in which a spacing character is reproduced when a given number of code words were present in the storage register immediately prior to that print cycle.

18. The method of controlling the print rate of a column-sequential dot matrix printer, according to Claim 16, including:

detecting the presence of a code word in a given stage of the storage register, at a time Y approximately coincident with the end of a preceding print cycle, and applying the variable print rate timing signal to the printer whenever the preceding cycle was completed with no new code word detected in the given stage of the storage register at time Y.

19. The method of controlling the print rate of a column-sequential dot matrix printer, according to Claim 18, including:

detecting the presence of a code word in the given stage of the storage register at a time X near the end of the preceding print cycle, but prior to time Y;

detecting code words representative of spacing characters, as distinguished from code words representative of other machine functions, in the given stage of the storage register;

applying the normal print rate timing signal to the printer for a spacing charater print cycle when the preceding cycle included reproduction of a spacing character, no code word was recorded in the given stage of the storage register at time X, and a code word for a spacing character was recorded in the given stage of the storage register at time Y;

and applying the fast print rate timing signal to the printer when the preceding cycle included reproduction of a spacing character and a code word for a spacing character was recorded in the given stage of the storage register at both timex X and Y.

20. The method of controlling the print rate of a column-sequential dot matrix printer, according to Claim 19, including:

applying the variable print rate timing signal to the printer for each spacing character print cycle following completion of a line feed or carriage return operation of the printer, whenever a given number of code words are in storage.

21. The method of controlling the print rate of a high speed column-sequential dot matrix printer actuated by an input signal comprising a sequence of code words occurring at a maximum input rate, the printer comprising a print head, a print head drive for moving the print head through a number of column steps in a print cycle at a speed controlled by a print rate timing signal, and a multi-stage storage register, each stage capable of storing a complete code word, comprising the following steps:

detecting each of the following conditions:

A. a spacing character was reproduced in the preceding print cycle;

B. a new code word was recorded in the storage register at a given time Y in the preceding print cycle; and C. a given number of code words, in excess of one, was recorded in the storage register at a given time X, prior to Y, in the preceding print cycle;

D. a new code word recorded in an output stage of the storage register represents a line feed or carriage return function for the printer;

applying a normal print rate timing signal to the printer when conditions A and B are detected but conditions C and D are not detected;

applying a fast print rate timing signal having a frequency substantially higher than the normal frequency to the printer when conditions A and C are detected but condition D is not detected; and applying a variable print rate timing signal of progressively increasing frequency to the printer when condition B and D are not detected, independently of whether conditions A or C are detected.

22. The method of controlling the print rate of a column-sequential dot matrix printer, according to Claim 21, including:

E. detecting a new code word recorded in an output stage of the storage register that represents a nonprint function other than a carriage return or line feed;

and applying a fast print rate timing signal to the printer for a shortened cycle when conditions E is detected and condition D is not detected, independently of whether conditions A, B or C are detected.

23. The method of controlling the print rate of a column-sequential dot matrix printer, according to Claim 21, for a printer in which the storage register is a FIFO shift register, including:

clearing the output stage of the storage register and advancing a new code word thereto, if available, during the last column step in each print cycle of the printer, prior to time X;

and determining conditions B and C by monitoring the output stage of the storage register.

24. The method of controlling the print rate of a column-sequential dot matrix printer, according to Claim 21, including:

applying the variable print rate timing signal to the printer for a spacing character reproduction cycle following a line feed or carriage return cycle, independently of detection of conditions A, B or C.

* * * * *